(12) United States Patent
Haga et al.

(10) Patent No.: US 8,928,261 B2
(45) Date of Patent: Jan. 6, 2015

(54) POWER TOOL HAVING CIRCUIT BOARD

(75) Inventors: Hiroshi Haga, Ibaraki (JP); Hideyuki Hashimoto, Ibaraki (JP); Hideyuki Tanimoto, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 172 days.

(21) Appl. No.: 13/182,332

(22) Filed: Jul. 13, 2011

(65) Prior Publication Data

US 2012/0014065 A1 Jan. 19, 2012

(30) Foreign Application Priority Data

Jul. 14, 2010 (JP) ................. 2010-159551

(51) Int. Cl.
| | | |
|---|---|---|
| H02P 6/00 | (2006.01) | |
| B25B 23/14 | (2006.01) | |
| B25F 5/00 | (2006.01) | |
| B25B 21/00 | (2006.01) | |

(52) U.S. Cl.
CPC .......... *B25B 21/002* (2013.01); *B25B 23/1415* (2013.01); *B25F 5/008* (2013.01); *B25F 5/006* (2013.01)
USPC .................................... 318/400.01

(58) Field of Classification Search
None
See application file for complete search history.

(56) References Cited

U.S. PATENT DOCUMENTS

| | | | |
|---|---|---|---|
| 6,053,080 A | 4/2000 | Kaneyama et al. | |
| 6,123,158 A | 9/2000 | Steffen | |
| 6,866,105 B2 | 3/2005 | Pfisterer et al. | |
| 7,055,620 B2 | 6/2006 | Nadig et al. | |
| 7,768,750 B2 | 8/2010 | Uchida | |
| 8,084,901 B2 | 12/2011 | Oomori et al. | |
| 8,338,997 B2 | 12/2012 | Nishikawa | |
| 2006/0097602 A1 | 5/2006 | Tanimoto et al. | |
| 2006/0255756 A1* | 11/2006 | Iwata et al. .................. | 318/254 |
| 2008/0135268 A1* | 6/2008 | Tadokoro et al. ............. | 173/2 |
| 2009/0229957 A1 | 9/2009 | Nishimiya et al. | |
| 2009/0275273 A1* | 11/2009 | Purohit et al. ............... | 451/357 |
| 2010/0026107 A1 | 2/2010 | Hosokawa | |
| 2010/0253162 A1 | 10/2010 | Sakamaki et al. | |
| 2010/0283332 A1* | 11/2010 | Toukairin et al. ............ | 310/50 |
| 2013/0119792 A1 | 5/2013 | Nishimiya et al. | |

FOREIGN PATENT DOCUMENTS

| | | |
|---|---|---|
| CN | 1773811 A | 5/2006 |
| CN | 100517917 A | 4/2007 |
| CN | 101181787 A | 5/2008 |
| CN | 101637826 A | 2/2010 |

(Continued)

OTHER PUBLICATIONS

Office Action from China Intellectual Property Office for application 201110196772.3 (Jul. 3, 2013).

(Continued)

*Primary Examiner* — Shawki S Ismail
*Assistant Examiner* — Zoheb Imtiaz
(74) *Attorney, Agent, or Firm* — Kilpatrick Townsend & Stockton LLP

(57) ABSTRACT

A power tool includes a brushless motor, a switching element, a power cable a rectifying device, a heat releasing member. The switching element controls a drive of the brushless motor. The power cable supplies an electric current to the brushless motor from power source. The rectifying device rectifies the electric current from the power cable. The heat releasing member is connected to the switching element and the rectifying device in order to enhance a cooling efficiency for the same.

15 Claims, 19 Drawing Sheets

(56) References Cited

FOREIGN PATENT DOCUMENTS

| | | |
|---|---|---|
| EP | 2085191 A1 | 8/2009 |
| JP | 10-156745 A | 6/1998 |
| JP | 11-129162 A | 5/1999 |
| JP | 11-156741 A | 6/1999 |
| JP | 2000-515435 A | 11/2000 |
| JP | 2002-039885 A | 2/2002 |
| JP | 2003-199310 A | 7/2003 |
| JP | 2004-1233 A | 1/2004 |
| JP | 2004-098282 A | 4/2004 |
| JP | 2004-518551 A | 6/2004 |
| JP | 2005-514888 A | 5/2005 |
| JP | 2005-193310 A | 7/2005 |
| JP | 2007-136607 A | 6/2007 |
| JP | 2008-173712 A | 7/2008 |
| JP | 2008-173716 A | 7/2008 |
| JP | 2008-307664 A | 12/2008 |
| JP | 2009-095902 A | 5/2009 |
| JP | 2009-214260 A | 9/2009 |
| JP | 2010-058186 A | 3/2010 |
| JP | 2010-120120 A | 6/2010 |
| WO | WO03055044 A1 | 7/2003 |

OTHER PUBLICATIONS

Japan Patent Office office action for application 2010-159551 (Jan. 16, 2014).

\* cited by examiner

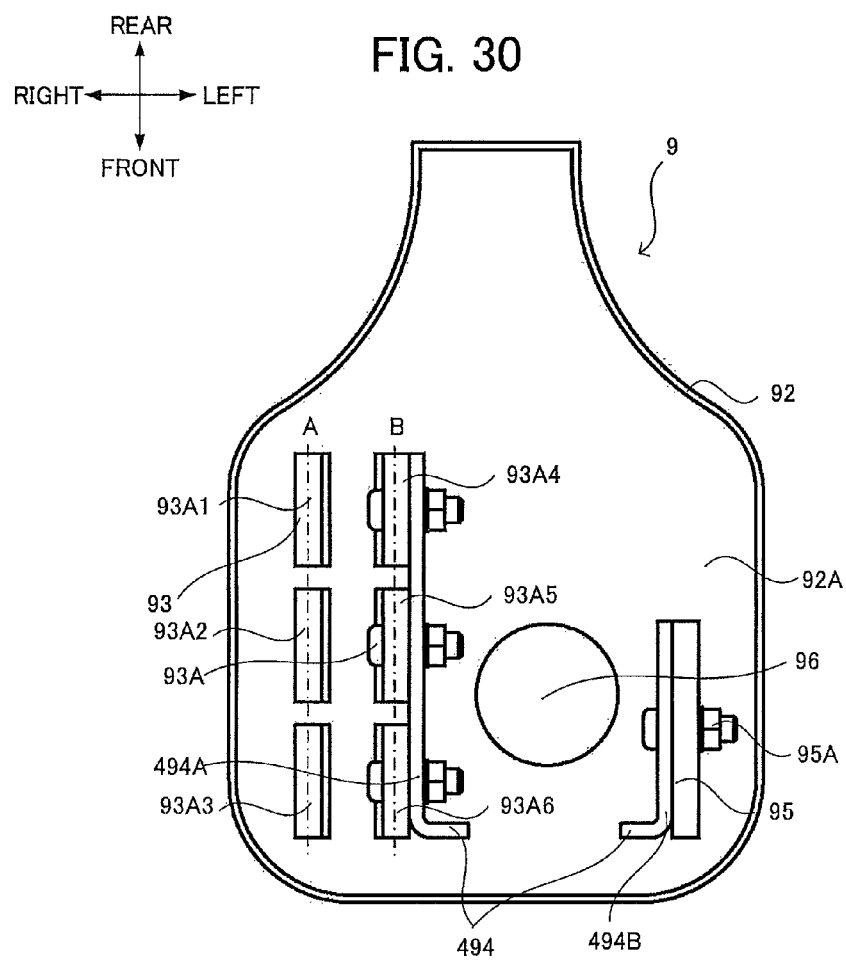
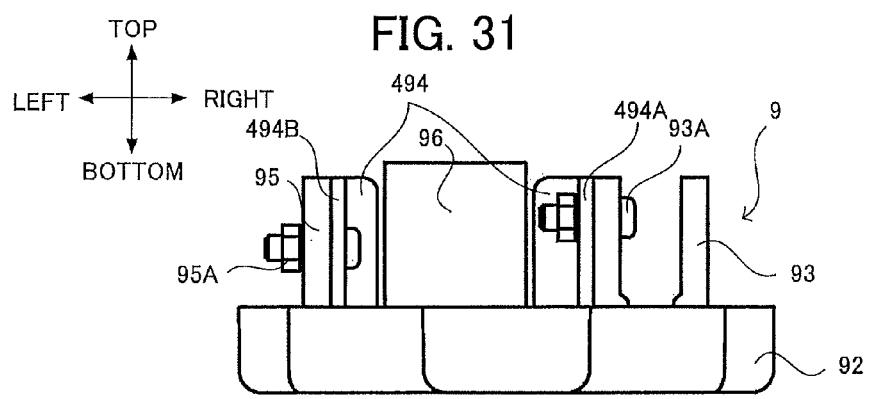

POWER TOOL HAVING CIRCUIT BOARD

CROSS REFERENCE TO RELATED APPLICATION

This application claims priority from Japanese Patent Application No. 2010-159551 filed Jul. 14, 2010. The entire content of this priority application is incorporated herein by reference.

TECHNICAL FIELD

The present invention relates to a circuit board and a power tool having the circuit board, and more particularly, to a bolt tightening tool for tightening a high-tension bolt.

BACKGROUND

Conventionally, a high-tension bolt or a high-tension strength bolt is used for tightening structural members with each other while constructing a bridge, an iron frame construction, or the like. The high-tension bolt is tightened by a bolt tightening tool (shear wrench) disclosed in, for example, laid-open Japanese Patent Application Publication No. 2004-001233.

The shear wrench includes a housing, a circuit board, a commutator motor accommodated in the housing, a drive transmission mechanism, an inner socket, an outer socket, and a trigger. When an operator pulls the trigger, the commutator motor is driven, and the inner socket fitted to a tip of the high-tension bolt is rotated by way of the transmission mechanism, and the outer socket fitted to a nut is rotated in a direction opposite to the rotational direction of the inner socket. As a result, the high-tension bolt is tightened.

SUMMARY

However, the continuous use of the shear wrench causes the commutator motor and components on the circuit to raise their temperature, so that the commutator motor and the components may be broken by the heat.

Therefore, it is an object of the present invention to provide a power tool capable of enhancing a cooling efficiency to a motor and a circuit board.

In order to attain the above and other objects, the invention provides a power tool. The power tool includes a brushless motor, a switching element, a power cable, a rectifying device, and a heat releasing member. The switching element controls a drive of the brushless motor. The power cable supplies an electric current to the brushless motor. The rectifying device rectifies the electric current from the power cable. The heat releasing member is connected to the switching element and the rectifying device.

According to another aspect, the present invention provides a power tool. The power tool includes a brushless motor, a housing, an output unit, a circuit board, a switching element, a rectifying device, and a heat releasing member. The brushless motor includes a stator having a coil, and a rotor rotatable relative to the stator. The housing accommodates the brushless motor. The output unit is connected to and rotated by the rotor. The circuit board is accommodated in the housing. The switching element is fixed to the circuit board and is capable of supplying an electric power to the coil. The rectifying device is fixed to the circuit board. The heat releasing member is connected to the switching element and the rectifying device.

According to still another aspect, the present invention provides a power tool. The power tool includes a brushless motor, a housing, a switching element, and a heat releasing member. The housing accommodates the brushless motor and is formed with an intake port. The switching element is accommodated in the housing and controlling a drive of the brushless motor. The switching element includes a first switching element located adjacent to the intake port and a second switching element located away from the intake port. The heat releasing member is connected to the second switching element and isolated from the first switching element.

According to still another aspect, the present invention provides a power tool. The power tool includes a brushless motor, a switching element, a housing, and a heat releasing member. The switching element controls a drive of the brushless motor. The housing accommodates the brushless motor and the switching element and is formed with an intake port. The heat releasing member is connected to the switching element and is located nearer to the intake port than the switching element to the intake port.

According to still another aspect, the present invention provides a power tool. The power tool includes a brushless motor, a plurality of switching element, and a heat releasing member. The brushless motor includes a stator and a rotor. The stator includes a first coil, a second coil, a third coil positioned opposite to the first coil, and a fourth coil positioned opposite to the second coil. The rotor is rotatable relative to the stator. The plurality of switching elements includes a first switching element for supplying an electric power to the first coil, a second switching element for supplying the electric power to the second coil, a third switching element for supplying the electric power to the third coil, and a fourth switching element for supplying the electric power to the fourth coil. The heat releasing member is connected to the first switching element and the second switching element, and isolated from the third switching element and the fourth switching element.

According to still another aspect, the present invention provides a power tool. The power tool includes a brushless motor, an output unit, a circuit board, and a switching element. The brushless motor extends in a top-to-bottom direction. The output unit is connected to the brushless motor, and disposed above the brushless motor, and extending in a front-to-rear direction. The circuit board is disposed below the brushless motor and extends in the front-to-rear direction. The switching element is fixed to the circuit board.

According to still another aspect, the present invention provides a power tool. The power tool includes a brushless motor, an output unit, a circuit board, and a rotor detecting element. The brushless motor extends in a top-to-bottom direction. The output unit is connected to the brushless motor, and disposed above the brushless motor, and extending in a front-to-rear direction. The circuit board is disposed below the brushless motor and extends in the front-to-rear direction. The rotor detecting element detects a rotational position of the brushless motor and is fixed to the circuit board.

According to still another aspect, the present invention provides a power tool. The power tool includes a brushless motor, an output unit, and a circuit board. The brushless motor extends in a top-to-bottom direction. The output unit is connected to the brushless motor and disposed above the brushless motor and extends in a front-to-rear direction. The circuit board is disposed below the brushless motor and extending in the front-to-rear direction.

According to still another aspect, the present invention provides a circuit board. The circuit board includes a switching element, a rectifying device, and a heat releasing member.

The rectifying device rectifies an electric current. The heat releasing member is connected to the switching element and the rectifying device.

BRIEF DESCRIPTION OF THE DRAWINGS

The particular features and advantages of the invention as well as other objects will become apparent from the following description taken in connection with the accompanying drawings, in which:

FIG. 30 is a plane view showing the circuit board unit in the shear wrench according to the fourth embodiment;

FIG. 31 is a rear view showing the circuit board unit in the shear wrench according to the fourth embodiment;

DETAILED DESCRIPTION

Figure 1:
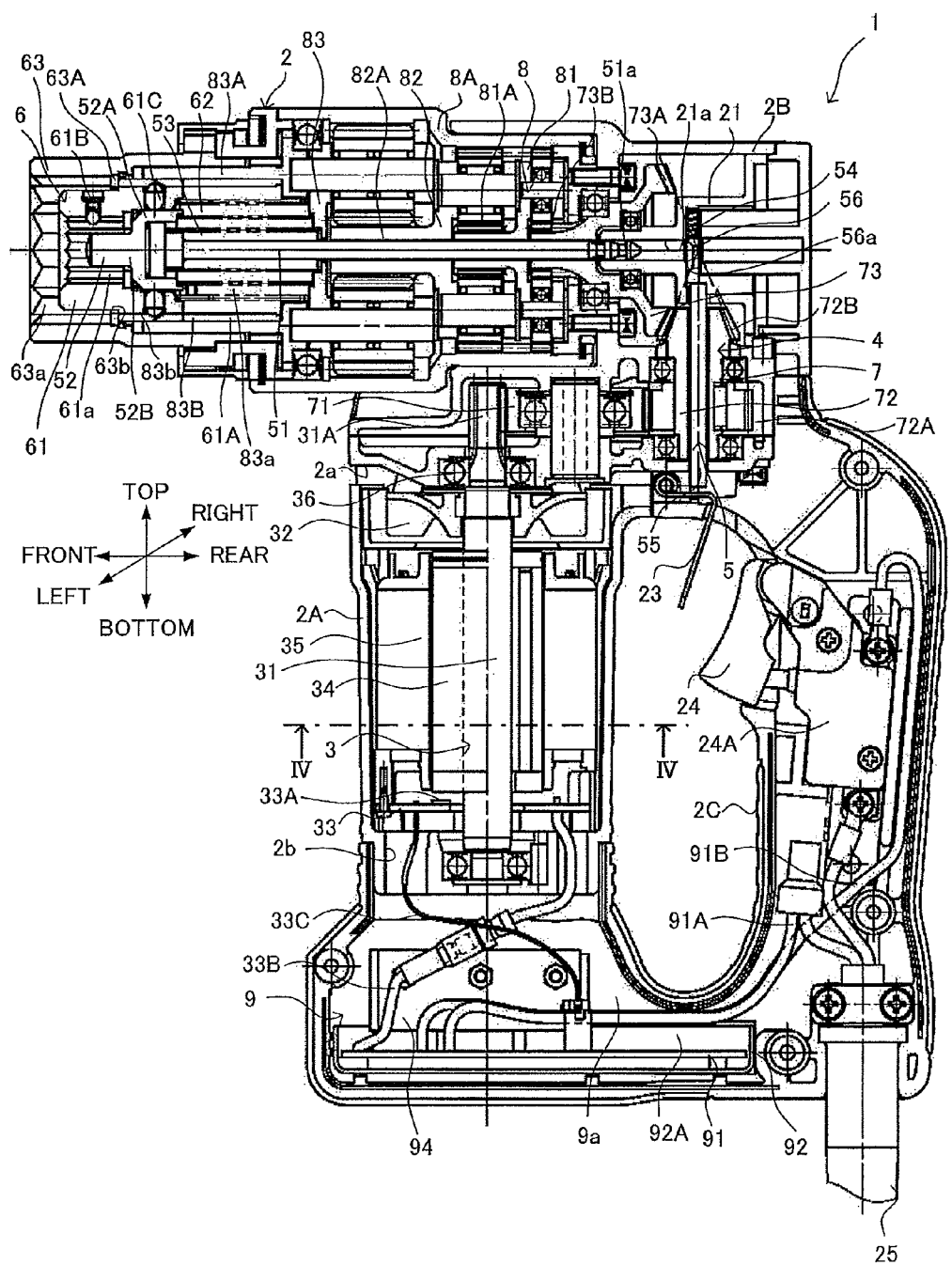
FIG. 1 is a cross-sectional view of a shear wrench as viewed from lateral side according to a first embodiment of the present invention.

A bolt tightening tool (shear wrench) as an example of a power tool according to a first embodiment of the present invention will be described with reference to FIGS. 1-13. The shear wrench 1 includes a housing 2, a brushless motor 3, a rotational drive transmission mechanism 4, a bolt-tip discharging mechanism 5, a socket unit 6, and a circuit board unit 9.

The housing 2 constitutes an outer shell of the shear wrench 1 and mainly includes a motor housing 2A, a gear case 2B, and a handle housing 2C. The motor housing 2A extends from the gear case 2B in a direction perpendicular to a longitudinal direction of the gear case 2B. In the following description, an extending direction of the motor housing 2A from the gear case 2B will be referred to as "downward" direction, and a direction opposite to the downward direction will be referred to as "upward" direction. Further, a direction toward the socket unit 6 from the gear case 2B will be referred to as a "forward" direction, and a direction opposite to the forward direction will be referred to as a "rearward" direction. Further, directions orthogonal to forward and rearward directions and upward and downward directions will be referred to as "leftward" and "rightward" direction.

The motor housing 2A is a cylindrical member made from resin and extends in top-to-bottom direction. The motor housing 2A has an upper portion formed with an outlet port 2a and a lower portion formed with a ventilation port 2b in communication with the handle housing 2C. The motor housing 2A is provided at front side of the handle housing 2C and extends downward from the gear case 2B.

The brushless motor 3 is accommodated in the motor housing 2A and mainly includes a rotational shaft 31 extending vertically, a cooling fan 32, a circuit board 33, a rotor 34, and a stator 35. The rotational shaft 31 is rotatably supported through motor bearings 36 and has an upper end portion provided with a pinion gear 31A. The cooling fan 32 is coaxially fixed to the rotational shaft 31. The circuit board 33 is provided at a lower portion of the brushless motor 3 and has a hall element 33A for detecting an angular position of the rotor 34. The circuit board 33 is electrically connected to the circuit board unit 9 via a power cable 33B and a communication cable 33C passing through the ventilation port 2b. The power cable 33B is a cable for supplying an electric power (electric current) to a coil 35A described later on the circuit board 33, and the communication cable 33C is a cable for acquiring a signal at the circuit board unit 9 from the hall element 33A.

Figure 4:
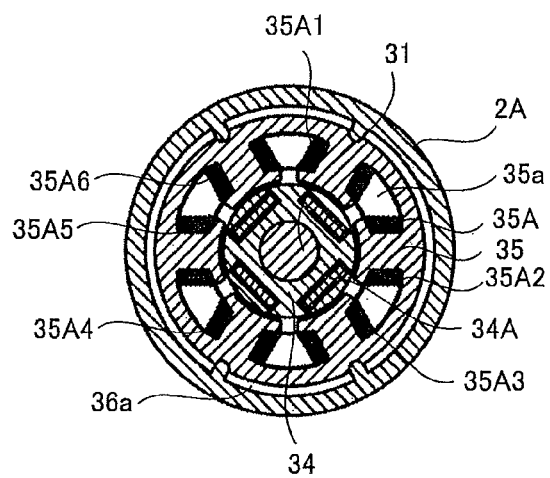
FIG. 4 is a cross-sectional view of the shear wrench taken along a line IV-IV in FIG. 1 according to the first embodiment.

As shown in FIG. 4, the rotor 34 is coaxially fixed to the rotational shaft 31 and two-pairs of permanent magnets 34A are provided in the rotor 34. The motor housing 2A has an inner circumferential surface provided with a plurality of ribs for supporting the stator 35 having a coil 35A. The coil 35A is configured of six coils 35A1-35A6. The six coils 35A1-35A6 are positioned so that the coil 35A1 is positioned diametrically opposite to the coil 35A4 with respect to the rotor 34, and the coil 35A2 is opposite to the coil 35A5 with respect to the rotor 34, and the coil 34A3 is opposite to the coil 35A6 with respect to the rotor 34. A clearance 35a is formed between neighboring coils 35A, and a gap 36a is formed between an outer surface of the stator 35 and the inner peripheral surface of the motor housing 2A. Therefore, cooling to the brushless motor 3 can be performed by air flow generated by the rotation of the cooling fan 32 and passing through the clearance 35a and the gap 36a.

The gear case 2B is made of aluminum (metal) and, as shown in FIG. 1, accommodates therein the rotational drive transmission mechanism 4 and the bolt-tip discharging mechanism 5. The rotational drive transmission mechanism 4 extends in front-to-rear direction, and includes a gear mechanism 7 and a planetary gear mechanism 8. A rod cover 21 is provided rearward of the gear case 2B and formed with an insertion hole 21a extending in front-to-rear direction into which a rear end portion of a rod 51 described later is inserted. The insertion hole 21a has an inner diameter slightly larger than an outer diameter of the rod 51. The gear case 2B and the motor housing 2A are fixed to each other by a screw (not shown).

The gear mechanism 7 is positioned rearward of the planetary gear mechanism 8 and includes a first gear 71 meshingly engaged with the pinion gear 31A, a second gear unit 72 meshingly engaged with the first gear 71, and a third gear unit 73 meshingly engaged with the second gear unit 72. The first gear 71 is a spur gear and rotatably supported to the housing 2. The first gear 71 has a rotational shaft extending parallel to the rotational shaft 31. The second gear unit 72 includes a second gear 72A that is a spur gear meshingly engaged with the first gear 71 and a first bevel gear 72B rotated coaxially and integrally with the second gear 72A. The second gear unit 72 has a rotational shaft extending parallel to the rotational shaft of the first gear 71 and is rotatably supported to the housing 2 via bearings. The second gear unit 72A is formed with a through hole penetrating in top-to-bottom direction into which a plate rod 55 described later is inserted.

The third gear unit 73 includes a second bevel gear 73A meshingly engaged with the first bevel gear 72B and a first sun gear 73B positioned forward of the second bevel gear 73A. The first sun gear 73B is rotatable coaxially and integrally with the second bevel gear 73A. The third gear unit 73 is rotatably supported to the rod cover 21 and has a rotational center portion formed with a through hole extending in front-to-rear direction. The rod 51 is inserted through the through hole.

The planetary gear mechanism 8 includes a first gear unit 81, a second gear unit 82, a third gear unit 83, and an outer unit 8A serving as a ring gear. The first gear unit 81 is positioned forward of the third gear unit 73, and includes a second sun gear 81A for outputting decreased rotation of the first sun gear 73B and a first gear unit 81 that orbits about the first sun gear 73B as a sun gear while meshingly engaged with the outer unit 8A as a ring gear. The second gear unit 82 is positioned forward of the first gear unit 81, and includes a third sun gear 82A for outputting decreased rotation of the second sun gear 81A and a second planetary gear 82B that orbits about the second sun gear 81A as a sun gear while meshingly engaged with the outer unit 8A as a ring gear. The third gear unit 83 is positioned forward of the second gear unit 82, and includes an output unit 83A for outputting decreased rotation of the third sun gear 82A and a third planetary gear 83C that orbits about the third sun gear 82A as a sun gear while meshingly engaged with the outer unit 8A as a ring gear.

The output unit 83A is formed with a front opening and defines therein a socket accommodating space 83a capable of accommodating the inner socket 61 and an weight 52 described later. The output unit 83A has an inner surface provided with a spline receiving part 83B configured of a plurality of concave parts extending in front-to-rear direction. A ball receiving space 83b is defined immediately forward of the spline receiving part 83B to receive a ball 61C described later. The first-third gear units 81-83 are respectively formed with through holes extending in front-to-rear direction in communication with one another. The through hole in the third gear unit 83 has a front opening located within the socket accommodating space 83a. The through hole in the first gear unit 81 has a rear opening in confrontation with the first sun gear 73B and in communication with the through hole in the third gear unit 73.

The outer unit 8A is provided with a gear engaged with the first-third planetary gears 81-83 and rotatably supported to the third gear unit 83 via a bearing. Thus, the outer unit 8A is rotatable and immovable in front-to-rear direction relative to the housing 2.

The bolt-tip discharging mechanism 5 includes the bar-shaped rod 51, the weight 52, a the through hole in the third gear unit 73.n weight spring 53 for forwardly biasing the weight 52, a spring 54, the plate rod 55, and a plate 56. The rod 51 has an outer diameter slightly smaller than an inner diameter of the insertion hole 21a, a front end portion fixedly provided with the weight 52, and a rear end portion formed with a concave part 51a. The rod 51 is inserted into the through holes formed in the first-third planetary gears 81, 82, and 83 so that the rear end portion including the concave part 51a is positioned at the insertion hole 21a.

The weight 52 is accommodated in the socket accommodating space 83a and is configured of a seat portion 52A urged by the weight spring 53 and a pressing portion 52B positioned forward of the seat portion 52A. The weight spring 53 is located within the socket accommodating space 83a. The weight spring 53 has a front end portion in abutment with the seat portion 52A and a rear end portion in abutment with a rear surface of the socket accommodating space 83a so as to bias the weight 52 forward.

The spring 54 is located rearward of the gear case 2B and is supported to the rod cover 21. The plate rod 55 is of a bar shape and disposed within the through hole in the second gear unit 72 with its longitudinal direction aligned in top-to-bottom direction. The plate rod 55 has an upper end portion abuttable against a lower end portion of the plate 56 and a lower end portion abuttable against a lever 23 described later.

The plate 56 is located between the spring 54 and the plate rod 55 and urged downward by the spring 54. The plate 56 is formed with a through hole 56a having an inner diameter slightly larger than that of the insertion hole 21a, allowing the rod 51 to be insertable into the through hole 56a.

The socket unit 6 mainly includes the inner socket 61, a socket spring 62, and an outer socket 63. The inner socket 61 includes a spline part 61A, a tip pressing part 61B, and the ball 61C, and is capable of being accommodated within the socket accommodating space 83a. The inner socket 61 has a front end portion defining a tip accommodating space 61a and an outer surface provided with a stepped portion abuttable against an inner socket restricting member 63A described later positioned at substantially front-to-rear center of the inner socket 61. The socket unit 6 serves as an output unit of the present invention.

Figure 5:
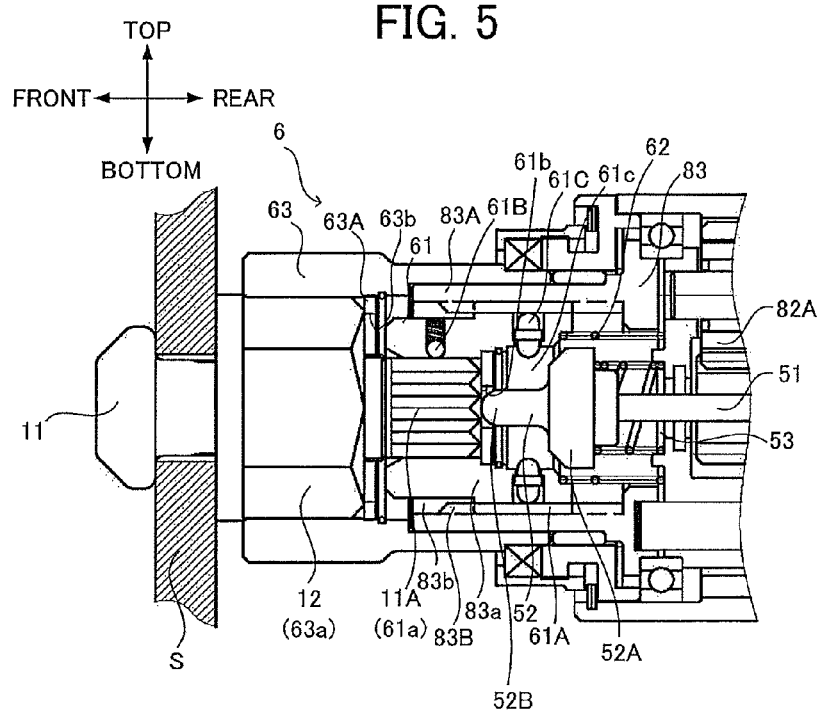
FIG. 5 is an enlarged cross-sectional view ambient to a socket unit fitting with a high-tension bolt in the shear wrench according to the first embodiment.

The tip accommodating space 61a opens toward the front side of the inner socket 61 and retains a bolt tip 11A of a high-tension bolt 11 as shown in FIG. 5. A peripheral surface of the tip accommodating space 61a is formed with a spline groove engageable with a spline of the bolt tip 11A. Thus, the inner socket 61 is rotatable together with the bolt tip 11A. A rear surface portion of the tip accommodating space 61a is formed with an opening 61b through which the pressing portion 52B of the weight 52 is protrudable toward the tip accommodating space 61a. A seat portion accommodating space 61c capable of accommodating the seat portion 52A is defined behind the opening 61b.

The spline part 61A is provided at the rear side and on the outer surface of the inner socket 61 and is meshingly engaged with the spline receiving part 83B in the socket accommodating space 83a. The inner socket 61 is unrotatable and movable in front-to-rear direction relative to the output unit 83A. Thus, the inner socket 61 rotates integrally with the output unit 83A.

The tip pressing part 61B includes a ball disposed in a hole formed at a front portion of the inner socket 61, and a spring for urging the ball downward. The ball urged by the spring protrudes to the tip accommodating space 61a and presses the bolt tip 11A accommodated in the tip accommodating space 61a, which causes the bolt tip 11A to be retained therein.

The ball 61C is vertically moveable in a hole penetrating from an outer surface of the inner socket 61 to an inner surface of the seat portion accommodating space 61c. The ball 61C is configured to abut against the seat portion 52A and partially protrude from the outer surface of the inner socket 61 (FIG. 1) when the seat portion 52A is placed at the seat portion accommodating space 61c. In this state, even if the inner socket 61 is urged to be inserted into the socket accommodating space 83a, a part of the ball 61C protruding to the ball receiving space 83b comes into contact with the spline receiving part 83B.

Figure 6:
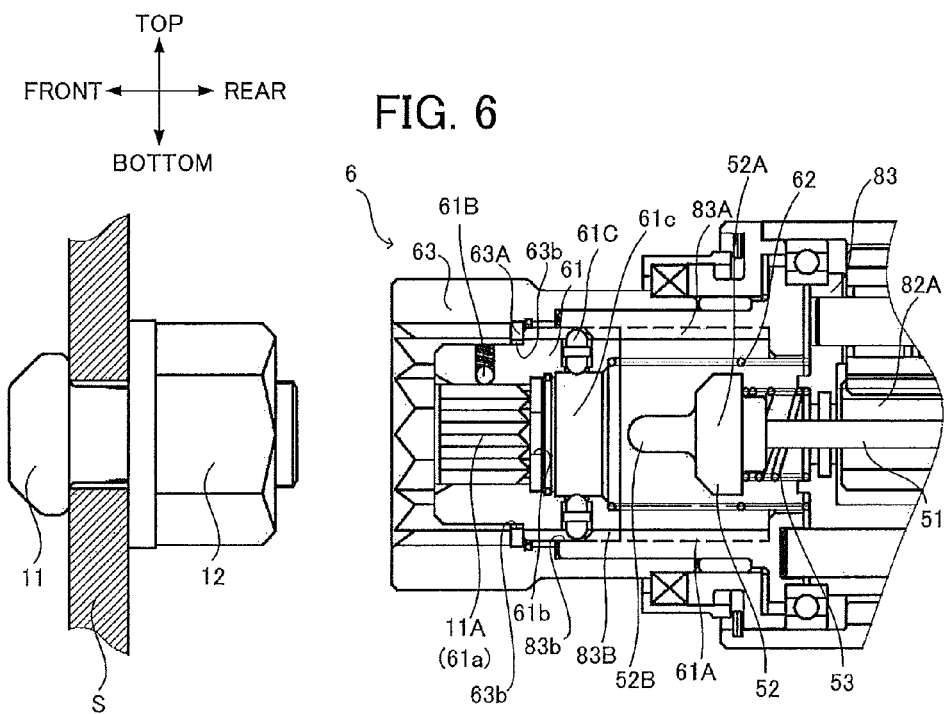
FIG. 6 is an enlarged cross-sectional view ambient to the socket unit when the high-tension bolt in the shear wrench has been tightened according to the first embodiment.

Consequently, the inner socket 61 cannot move rearward. On the other hand, when the seat portion 52A is retracted from the seat portion accommodating space 61c, the ball 61C can move in top-to-bottom direction. As a result, the inner socket 61 can move rearward (FIG. 6).

The socket spring 62 is accommodated in the socket accommodating space 83a with accommodating the weight 52 and the weight spring 53 therein. The socket spring 62 has a front end portion in abutment with the inner socket 61 and a rear end portion in abutment with the rear surface portion of the socket accommodating space 83a so as to bias the inner socket 61 frontward.

The outer socket 63 is fixedly connected to the outer unit 8A and integrally rotatable with the same. The outer socket 63 has a front portion defining a nut accommodating space 63a and includes the inner socket restricting member 63A. The nut accommodating space 63a opens toward the front side of the outer socket 63 and is engageable with a nut 12. Thus, the outer socket 63 integrally rotates with the nut 12. The inner socket restricting member 63A is provided at a rear surface portion of the nut accommodating space 63a and formed with an opening 63b into which the front portion of the inner socket 61 is insertable. As shown in FIG. 6, when the front portion of the inner socket 61 is inserted into the opening 63b, the stepped portion on the outer surface of the inner socket 61 is in abutment with the inner socket restricting member 63A, preventing the inner socket 61 urged by the socket spring 62 from falling in the nut accommodating space 63a.

Figure 2:
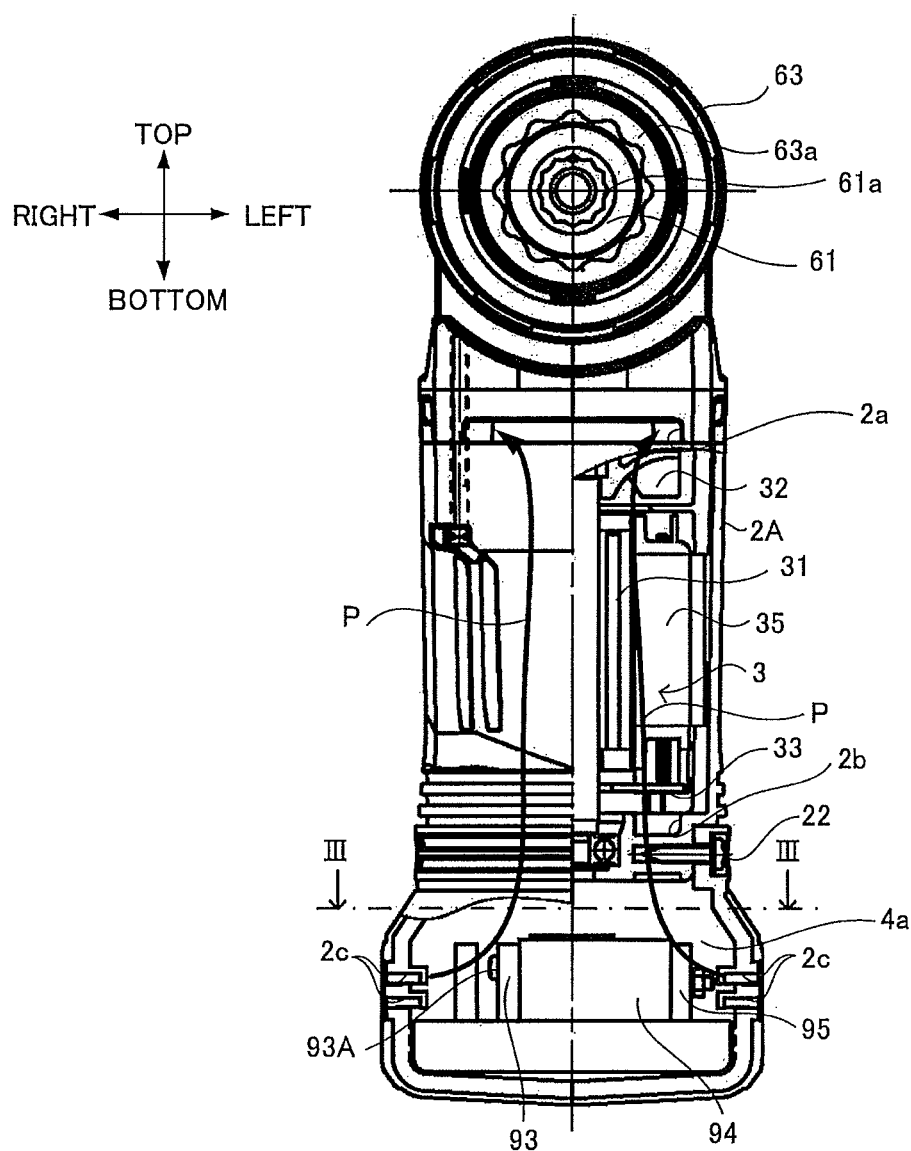
FIG. 2 is a partial cross-sectional view of the shear wrench as viewed from front side according to the first embodiment.
Figure 3:
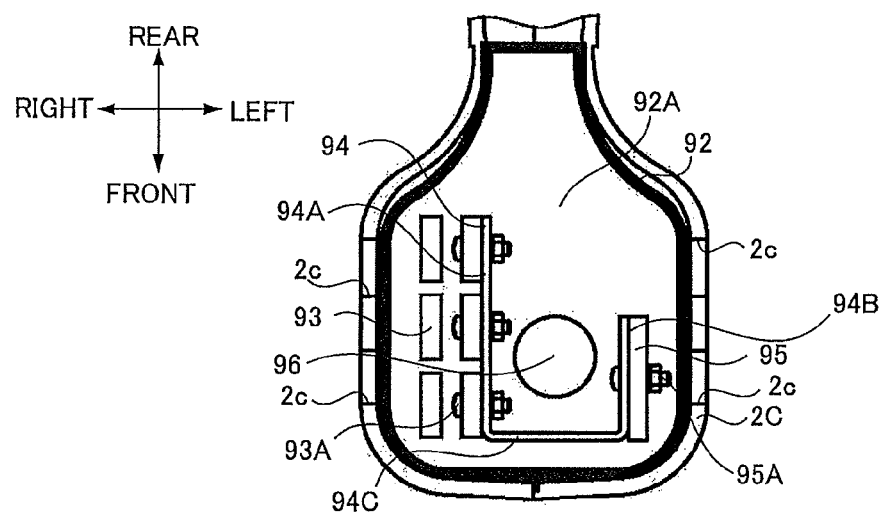
FIG. 3 is a cross-sectional view of the shear wrench taken along a line III-III in FIG. 2 according to the first embodiment.

The handle housing 2C has a cross-section substantially shaped like a letter L. The handle housing 2c has an upper portion fixedly connected to the gear case 2B by a screw (not shown), and a lower portion fixedly connected to the lower portion of the motor housing 2A by a screw 22 as shown in FIG. 2. The handle housing 2C is formed with eight intake ports 2c. Specifically, two intake ports 2c are positioned in top-to-bottom direction (FIG. 2) and four intake ports 2c are positioned on a plane taken along a line III-III in FIG. 2 (FIG. 3). The cooling to the brushless motor 3 is performed by cooling air suctioned through the intake port 2c, passing through the ventilation port 2b, the clearance 35a (FIG. 4), and the gap 36a (FIG. 4) to cool the circuit board unit 9, the circuit board 33, and the brushless motor 3, and is exhausted through the outlet port 2a (see arrow P in FIG. 2). The arrow P serves as an air flow path of the present invention. The handle housing 2C defines therein a circuit board unit accommodating space 9a for accommodating the circuit board unit 9 which controls the brushless motor.

The lever 23 is located at a connecting portion between the handle housing 2C and the gear case 2B, and a part of the lever 23 protrudes outside of the handle housing 2C. The lever 23 is provided for operating the bolt-tip discharging mechanism 5. Upon pulling the lever 23 by the operator, the lever 23 pivots upward and then the plate rod 55 and the plate 56 are moved upward against the urging force of the spring 54. Specifically, as shown in FIG. 1 (lever 23 does not pivot), a center of the through hole 56a is offset from that of the insertion hole 21a. When the lever 23 is pulled and pivots upward, the plate rod 55 is pressed by the lever 23 and the plate 56 moves upward against the urging force of the spring 54. By this movement, the center of the through hole 56a is coincident with that of the insertion hole 21a.

The handle housing 2C is equipped with a trigger 24 for switching a power supply to the brushless motor 3. The trigger 24 is electrically connected to a switch mechanism 24A accommodated in the handle housing 2C. The handle housing 2C has a lower portion from which a power cable 25 connectable with a power source (not shown) extends.

As shown in FIGS. 7 to 13, the circuit board unit 9 includes a circuit board 91 (FIG. 1), a circuit board support member 92, a plurality of switching elements 93, a heat releasing member 94, a diode bridge 95, and a capacitor 96. As shown in FIG. 1, the circuit board 91 extends in front-to-rear direction and is accommodated in the circuit board support member 92 having a vessel shape. The circuit board 91 is electrically connected to the power cable 25 via an electric cable 91A, and connected to the switch mechanism 24A via an electric cable 91B. The circuit board 91 has a microcomputer (not shown) for controlling the brushless motor 3.

The circuit board support member 92 has a cross-section substantially shaped like a letter U as viewed in a widthwise direction, and a depth capable of accommodating the circuit board 91. The circuit board support member 92 is filled with an urethane resin 92A in order to fix the circuit board 91 to the circuit board support member 92, to enhance vibration absorption of the circuit board 91, and to ensure an electrical insulation of components mounted on the circuit board 91. The circuit board support member 92 is supported in the handle housing 2C by a plurality of ribs (not shown). In the first embodiment, a field effect transistor (FET) is employed as the switching element 93. The diode bridge 95 (bridge diode) is configured of four conventional diodes and is adapted to rectify an alternate current from a commercial power source to a direct current. The diode bridge 95 serves as a rectifying device of the present invention.

Figure 9:
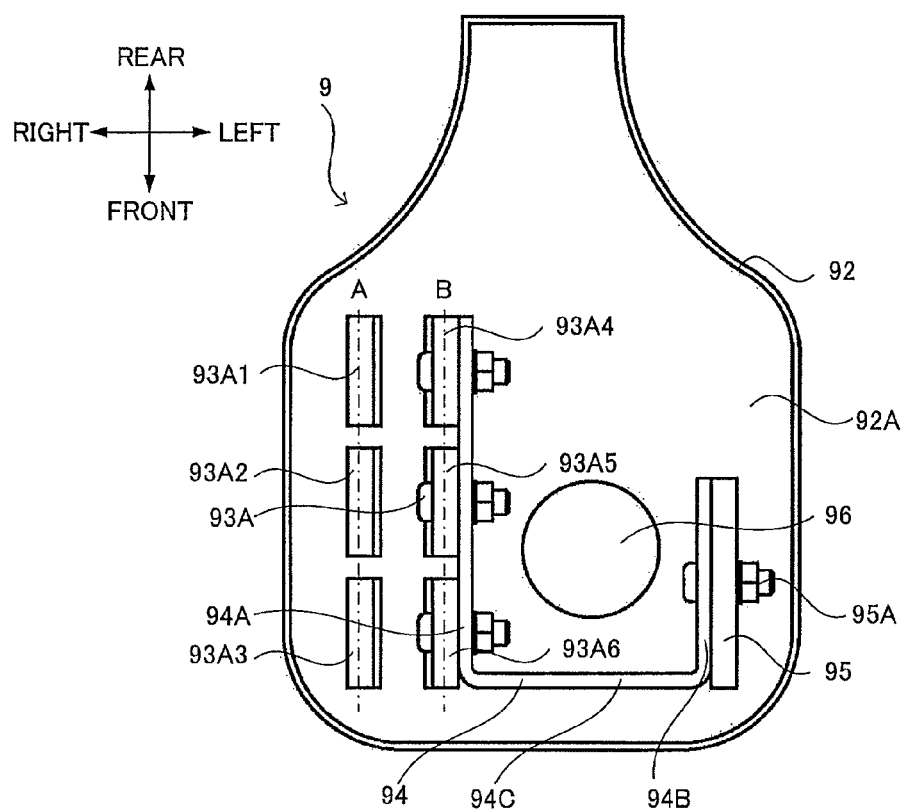
FIG. 9 is a plane view showing the circuit board unit in the shear wrench according to the first embodiment.

The plurality of switching elements 93 is configured of six switching elements 93A1-93A6 and is adapted to supply the electric power to the stator 35 to control the rotation of the brushless motor 3. As shown in FIG. 3, the switching element 93 is disposed adjacent to the right side intake ports 2c. Specifically, as shown in FIG. 9, the switching elements 93A1-93A3 are juxtaposed in front-to-rear direction (chain-line as indicated by an array A) and the switching elements 93A4-93A6 are juxtaposed in front-to-rear direction (chain-line as indicated by an array B) apart from the array A at a prescribed distance.

The switching elements 93A1-93A3 on the array A are electrically and respectively connected to the coils 35A1-35A3, and the switching elements 93A4-93A6 on the array B are electrically and respectively connected to the coils 35A4-35A6. The switching element 93A1 and the switching element 93A4 simultaneously distribute the electric power to the coil 35A1 and the coil 35A4 respectively, the switching element 93A2 and the switching element 93A5 simultaneously distribute an electric power to the coil 35A2 and the coil 35A5 respectively, and the switching element 93A3 and the switching element 93A6 simultaneously distribute an electric power to the coil 35A3 and the coil 35A6 respectively.

The switching element 93 has a rectangular cross-section in a direction orthogonal to the vertical direction. The rectangular cross-section has a long or major side extending in front-to-rear direction and a short or minor side extending in right-to-left direction. As shown in FIG. 3, the switching element 93 on the array A has a rightward long side surface in confrontation with the intake port 2c to efficiently receive cooling air passing therethrough, so that a cooling efficiency to the switching element 93 can be enhanced.

Figure 7:
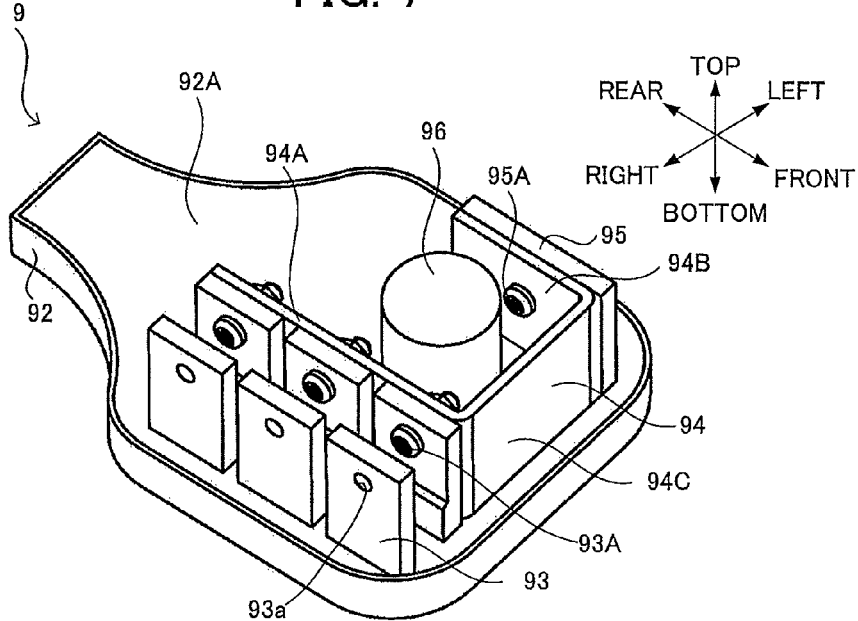
FIG. 7 is a front perspective view showing a circuit board unit in the shear wrench according to the first embodiment.
Figure 8:
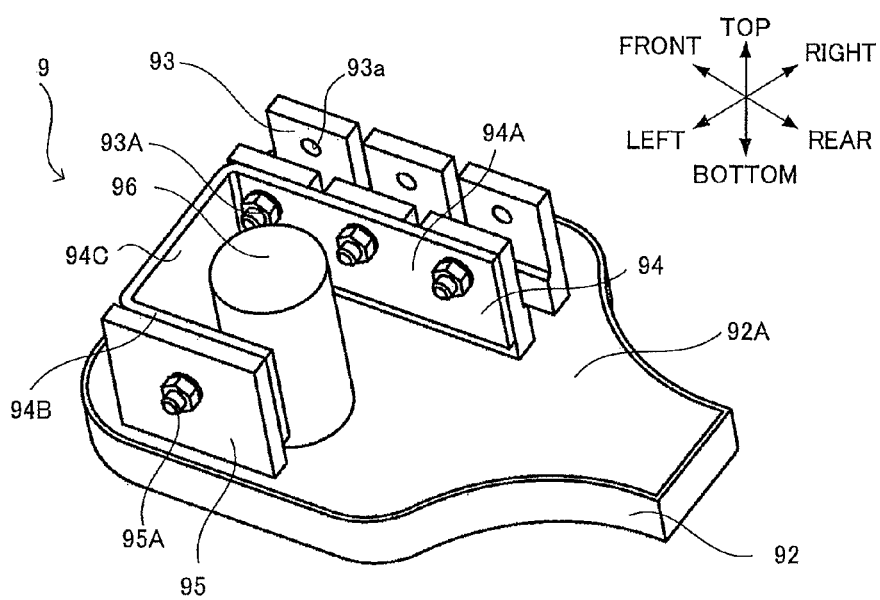
FIG. 8 is a rear perspective view showing the circuit board unit in the shear wrench according to the first embodiment.

An outer surface of the switching element 93 is entirely covered with conductive metal. As shown in FIGS. 7 and 8, the switching element 93 has an upper portion formed with a pinhole 93a penetrating in right-to-left direction. The switching elements 93A4-93A6 on the array B have a leftward long side surface fixedly connected to a switching element connecting part 94A of the heat releasing member 94 described later by a bolt 93A inserted into the pinhole 93a (FIG. 9). A heat releasing grease is applied between the switching element 93 and the heat releasing member 94 to firmly fix with each other and improve heat transfer therebetween. Even if the switching elements 93A1-93A3 on the array A interrupt cooling air from the intake port 2c, the switching elements 93A4-93A6 on the array B can be sufficiently cooled because of the connection to the heat releasing member 94. Further, the array A is disposed adjacent to the array B so that the switching elements 93A1-93A6 are disposed at one location on the circuit board 91, whereby components on the circuit board 91 can be collectively allocated and a compact circuit board can be achieved.

Figure 10:
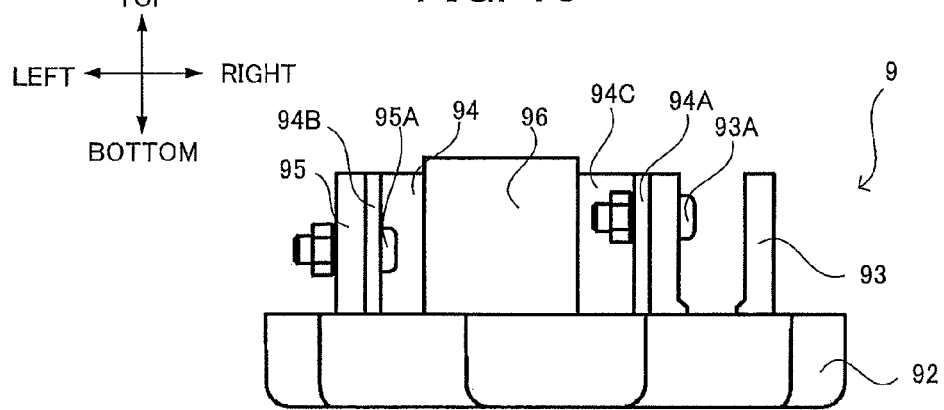
FIG. 10 is a rear view showing the circuit board unit in the shear wrench according to the first embodiment.
Figure 11:
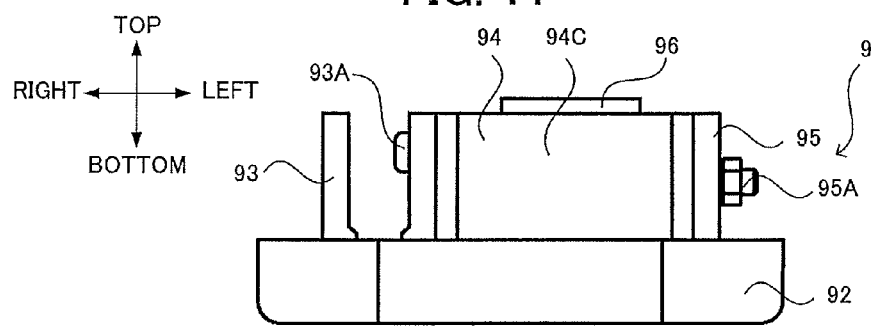
FIG. 11 is a front view showing the circuit board unit in the shear wrench according to the first embodiment.
Figure 12:
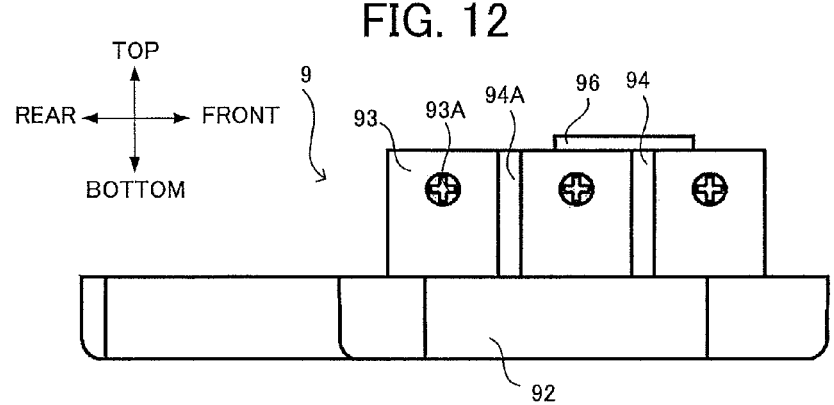
FIG. 12 is a right side view showing the circuit board unit in the shear wrench according to the first embodiment.
Figure 13:
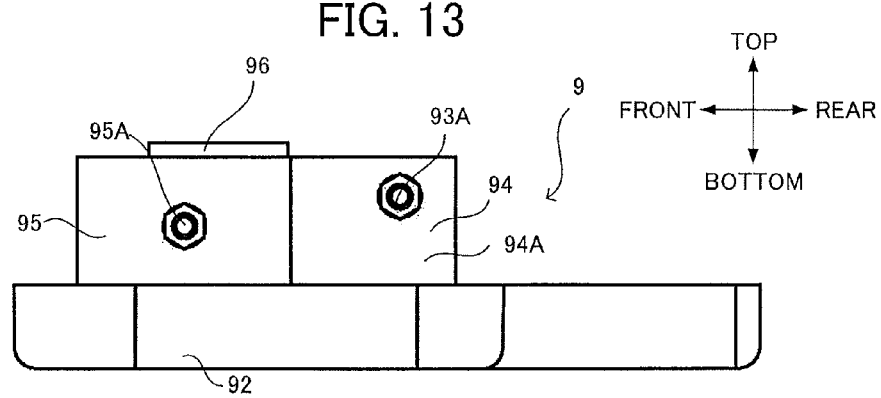
FIG. 13 is a left side view showing the circuit board unit in the shear wrench according to the first embodiment.
Figure 14:
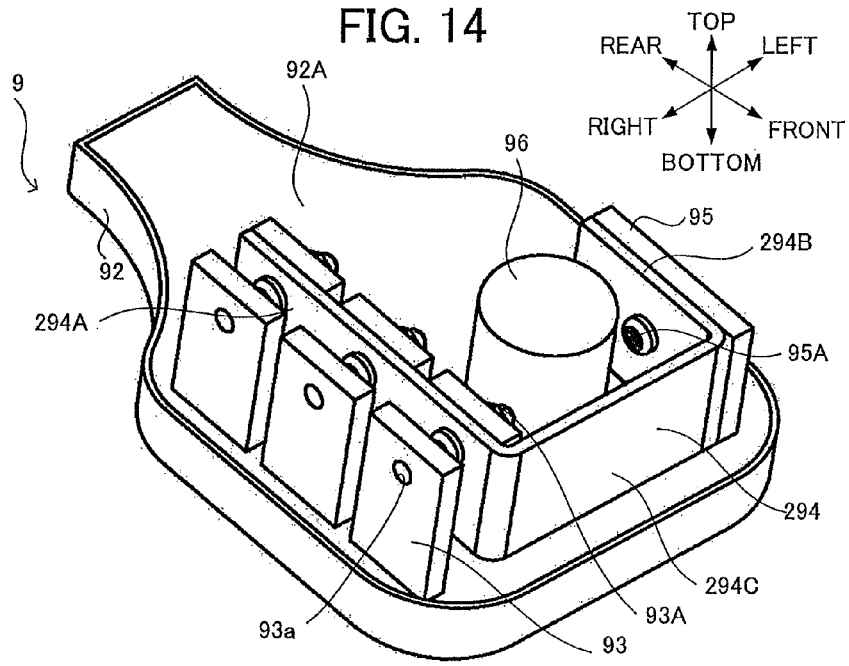
FIG. 14 is a front perspective view showing a circuit board unit in a shear wrench according to a second embodiment of the present invention.
Figure 15:
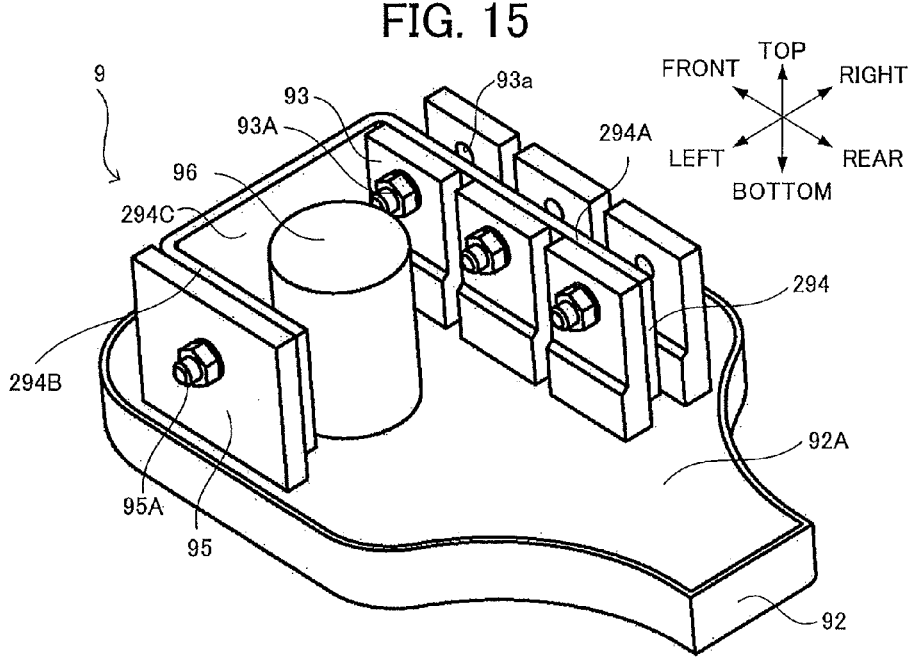
FIG. 15 is a rear perspective view showing the circuit board unit in the shear wrench according to the second embodiment.

The heat releasing member 94 is made of aluminum and has a cross-section substantially like a letter L as viewed from top (FIG. 9). The heat releasing member 94 includes the switching element connecting part 94A connecting to the switching element 93, a diode bridge connecting part 94B connecting to the diode bridge 95, and a connecting part 94C connecting the switching element connecting part 94A to the diode bridge connecting part 94B. As shown in FIGS. 10 and 11, the heat releasing member 94 has an upper end portion flushed with an upper end portion of the switching element 93, thereby ensuring a space immediately above the switching element 93 to accommodate a cable (not shown). As shown in FIGS. 1 and 8, the heat releasing member 94 has a lower end portion away from the circuit board 91 (urethane resin 92A), thereby avoiding a heat transition from the heat releasing member 94 to the circuit board 91.

The diode bridge 95 is disposed adjacent to the left side intake ports 2c on the circuit board 91 (FIG. 3). The diode bridge 95 has a rectangular cross-section in a direction orthogonal to the vertical direction. The rectangular cross-section has a long or major side extending in front-to-rear direction and a short or minor side extending in right-to-left direction. The diode bridge 95 has a rightward long side surface fixedly connected to the diode bridge connecting part 94B by a bolt 95A, thereby acquiring a sufficient heat release of the diode bridge 95. The diode bridge 95 has a leftward long side surface in confrontation with the intake port 2c to efficiently receive cooling air passing therethrough, so that a cooling efficiency to the diode bridge 95 can be enhanced.

The capacitor 96 is adapted to smooth the electric power supplied from the power cable 25 and located between the switching element 93 and the diode bridge 95.

Next, operation for fastening the high-tension bolt 11 will be described. As shown in FIG. 1, when the high-tension bolt 11 and the nut 12 are not respectively accommodated in the tip accommodating space 61a and the nut accommodating space 63a, the inner socket 61 is urged frontward by the socket spring 62, and the front portion of the inner socket 61 protrudes to the nut accommodating space 63a. The weight spring 53 urges the weight 52 and the rod 51 frontward. The seat portion 52A is accommodated in the seat portion accommodating space 61c, and the pressing portion 52B protrudes to the tip accommodating space 61a.

As shown in FIG. 5, after the high-tension bolt 11 and the nut 12 are temporarily engaged with each other through a steel plate S as a workpiece, the operator sets the shear wrench 1 to the high-tension bolt 11 so as to insert the bolt tip 11A into the tip accommodating space 61a and insert the nut 12 into the nut accommodating space 63a. By accommodating the bolt tip 11A in the tip accommodating space 61a, the bolt tip 11A is brought into abutment with the pressing portion 52B, and the rod 51 move rearward against the urging force of the weight spring 53. Since the seat portion 52A is retracted from the seat portion accommodating space 61c, the inner socket 61 can move rearward relative to the outer socket 63. The inner socket 61, the weight 52, and the rod 51 move rearward against the urging force of the socket spring 62 when the nut 12 is brought into abutment with the inner socket 61. Subsequently, the nut 12 is accommodated in the nut accommodating space 63a. Then, the concave part 51a formed at the rear portion of the rod 51 is caught by the through hole 56a, and the frontward movement of the weight 52 is restricted.

When the operator pulls the trigger 24, the brushless motor 3 is driven and the cooling fan 32 is rotated. Then, cooling air suctioned from the intake ports 2c cools the circuit board unit 9, the circuit board 33, and the brushless motor 3, and is discharged outside of the housing 2 through the outlet port 2a.

At the same time, the drive force is transmitted from the brushless motor 3 to the socket unit 6 via the rotational drive transmission mechanism 4. The inner socket 61 is rotated in a direction opposite to the outer socket 63, and the nut 12 is meshingly engaged with the high-tension bolt 11. The brushless motor 3 has been driven until the bolt tip 11A is wrenched off from the high-tension bolt 11. This reliably ensures that the nut 12 is tightened at a desired torque to the high-tension bolt 11.

When the operator separates the shear wrench 1 from the high-tension bolt 11 after the nut 12 has been tightened to the high-tension bolt 11, the socket spring 62 urges the inner socket 61 frontward. However, as shown in FIG. 6, since the forward movement of the weight 52 is restricted by the engagement between the concave part 51a of the rod 51 and the through hole 56a, the weight 52 is placed at the same position, i.e., the pressing portion 52B is away from the inner socket 61. The bolt tip 11A accommodated in the tip accommodating space 61a is pressed by the tip pressing part 61B, which prevents the bolt tip 11A from falling from the tip accommodating space 61a.

When the operator pulls the lever 23 to move the plate 56 upward against the urging force of the spring 54, the concave part 51a is disengaged from the through hole 56a. Then, the weight 52 instantaneously advances by the urging force of the weight spring 53 and bumps the bolt tip 11A accommodated in the tip accommodating space 61a. As a result, the bolt tip 11A is pushed out from the tip accommodating space to ready for next tightening operation.

With this configuration, since the heat releasing member 94 is firmly connected to the switching elements 93 and the diode bridge 95, the switching elements 93 and the diode bridge 95 can be efficiency cooled on a limited space of the circuit board 91. Thus, breakage of the switching elements 93 and the diode bridge 95 by heat can be avoided.

Further, since the heat releasing member 94 is disposed between the intake port 2c and the outlet port 2a, the cooling air passing from the intake port 2c to the outlet port 2a efficiently cools the heat releasing member 94.

Further, since the connecting part 94C is provided on the heat releasing member 94, the heat releasing member 94 can possess large surface area, thereby efficiently cooling the switching elements 93 and the diode bridge 95.

Further, the switching elements 93A1-93A6 control the supply of the electric power to the coils 35A1-35A6 such that the coils 35 opposing with each other with respect to the rotor 34 are simultaneously supplied to the electric power. If the switching element 93A1 supplying the electric power to the coil 35A1 is electrically connected to the switching element 93A4 supplying the electric power to the coil 35A4 opposite to the coil 35A1, electrical short circuiting between the switching element 93A1 and the switching element 93A4 may occur. However, the heat releasing member 94 is only connected to the switching element 93A4-93A6. Thus, the short circuit between the switching elements 93 can be avoided. Further, only one heat releasing member 94 can release heat on all switching elements 93A4-93A6.

Next, a shear wrench 201 according to a second embodiment will be described with reference to FIGS. 14 to 20 wherein like parts and components are designated by the same reference numerals as those shown in the first embodiment to avoid duplicating description.

Figure 16:
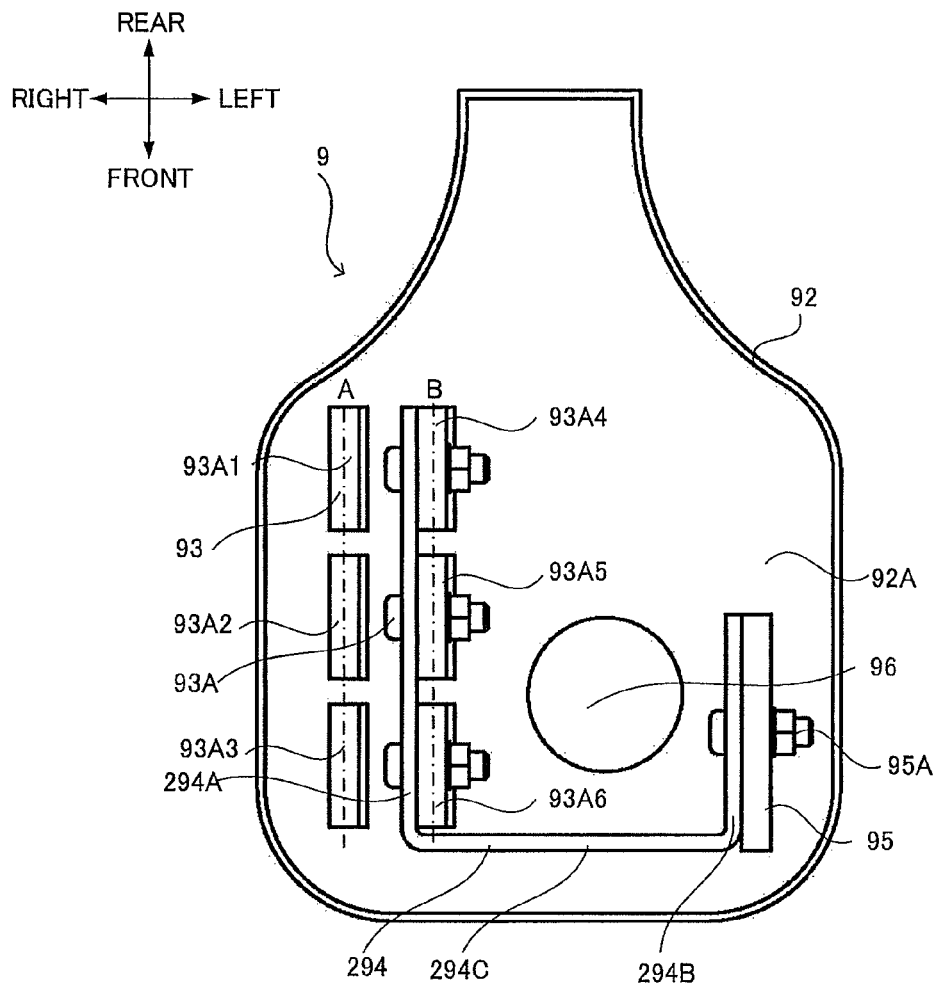
FIG. 16 is a plane view showing the circuit board unit in the shear wrench according to the second embodiment.
Figure 17:
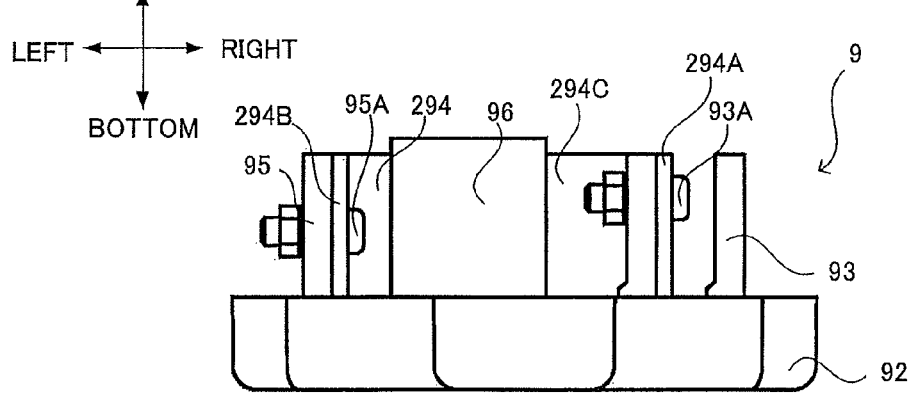
FIG. 17 is a rear view showing the circuit board unit in the shear wrench according to the second embodiment.
Figure 18:
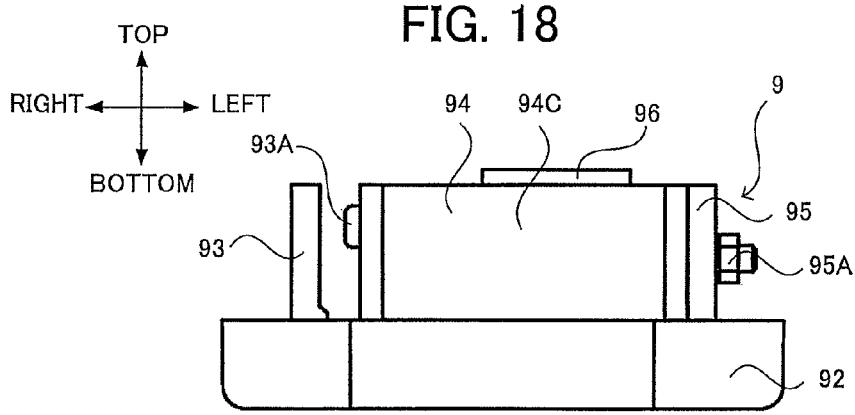
FIG. 18 is a front view showing the circuit board unit in the shear wrench according to the second embodiment.
Figure 19:
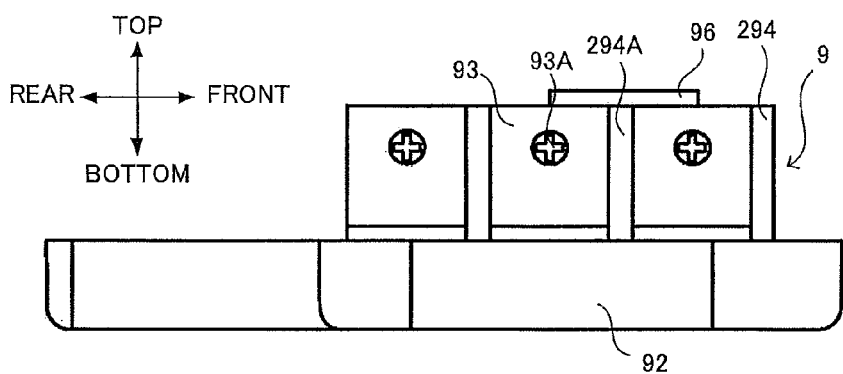
FIG. 19 is a right side view showing the circuit board unit in the shear wrench according to the second embodiment.
Figure 20:
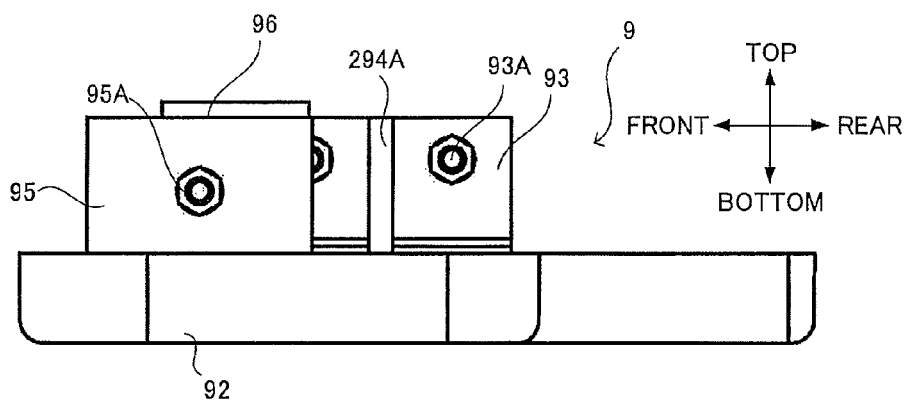
FIG. 20 is a left side view showing the circuit board unit in the shear wrench according to the second embodiment.

A heat releasing member 294 is made of aluminum and has a cross-section substantially like a letter L as viewed from top (FIG. 16). As shown in FIGS. 14 to 20, the heat releasing member 294 includes a switching element connecting part 294A connecting to the switching element 93, a diode bridge connecting part 294B connecting to the diode bridge 95, and a connecting part 294C connecting the switching element connecting part 294A to the diode bridge connecting part 294B. The switching element connecting part 294A is fixedly connected to the right side of the switching elements 93A4-93A6 on the array B by the bolt 93A and the diode bridge connecting part 294B is fixedly connected to the right side of the diode bridge 95 by the bolt 95A. Similar to the first embodiment, the heat releasing grease is applied between the switching element 93 and the switching element connecting part 294A.

Since the switching element connecting part 294A is fixedly connected to the right side of the switching elements 93, a location of the switching element connecting part 294A is nearer to the intake port 2c than the switching element connecting part 94A to the intake port 2c. The switching element connecting part 294A can efficiently receive cooling air and therefore a heat generation in the switching elements 93 can be suppressed. Thus, thermal breakdown of the switching elements 93 and the diode bridge 95 can be avoided. Further, since the connecting part 294C is provided on the heat releasing member 294, the heat releasing member 294 can possess large surface area, thereby efficiently releasing heat from the switching elements 93 and the diode bridge 95.

Next, a shear wrench 301 according to a third embodiment will be described with reference to FIGS. 21 to 27 wherein like parts and components are designated by the same reference numerals as those shown in the first embodiment to avoid duplicating description.

Figure 21:
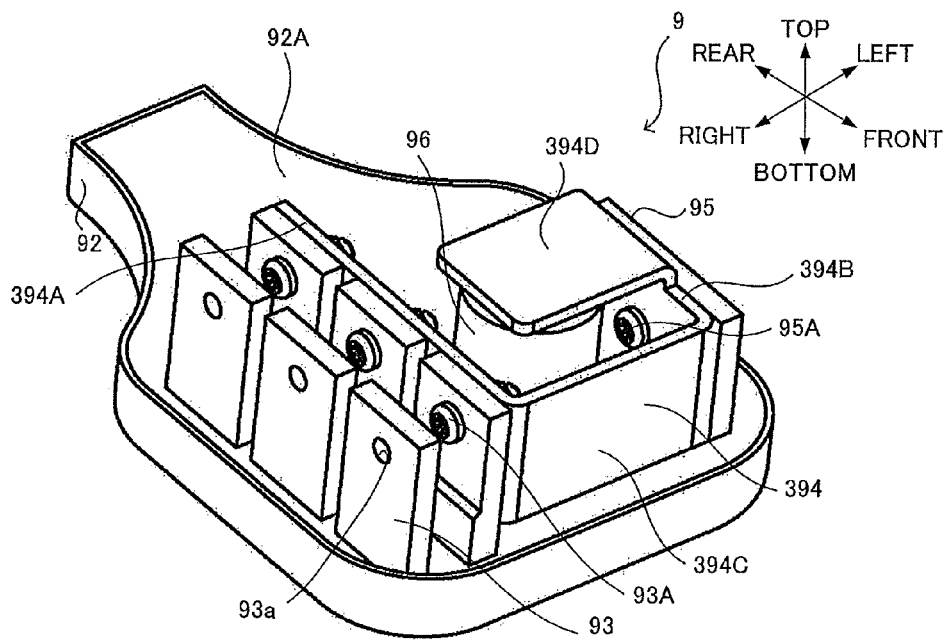
FIG. 21 is a front perspective view showing a circuit board unit in a shear wrench according to a third embodiment of the present invention.
Figure 22:
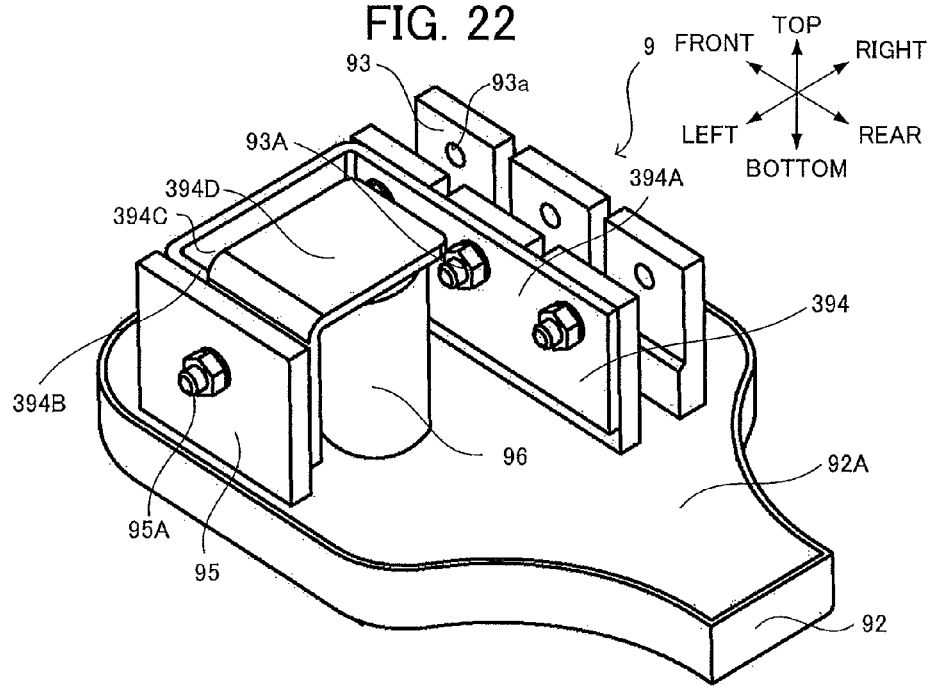
FIG. 22 is a rear perspective view showing the circuit board unit in the shear wrench according to the third embodiment.
Figure 23:
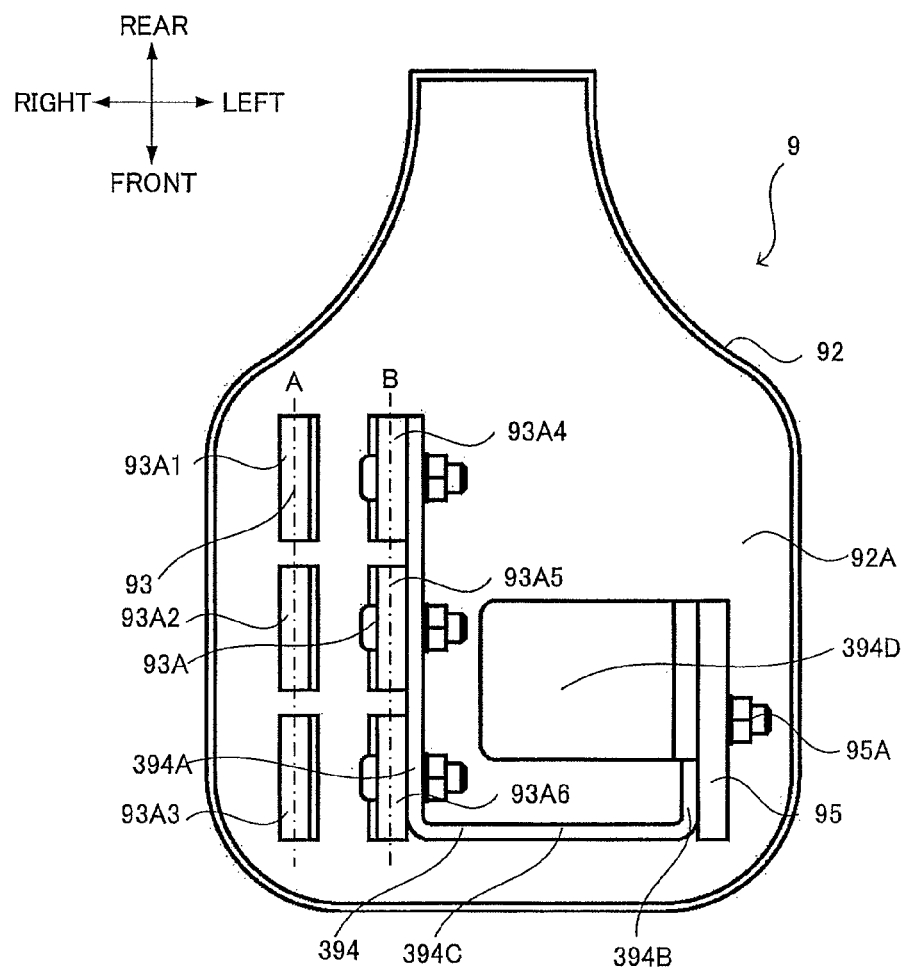
FIG. 23 is a plane view showing the circuit board unit in the shear wrench according to the third embodiment.
Figure 24:
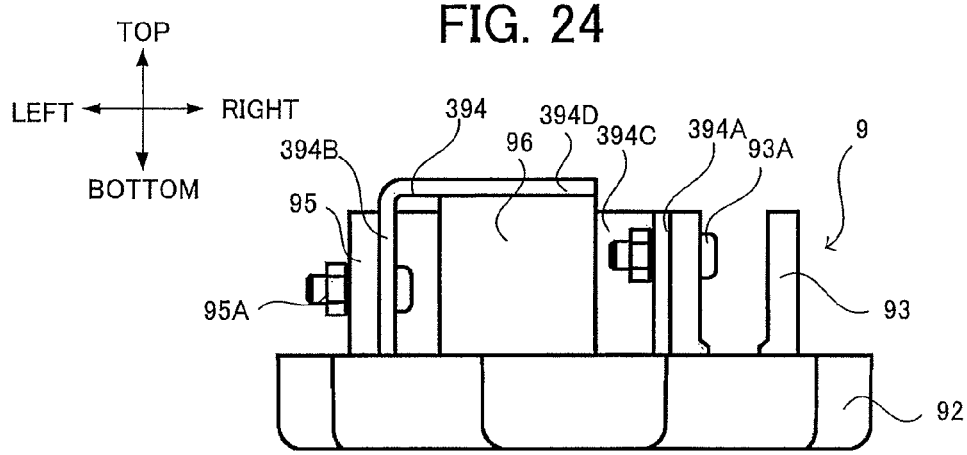
FIG. 24 is a rear view showing the circuit board unit in the shear wrench according to the third embodiment.
Figure 25:
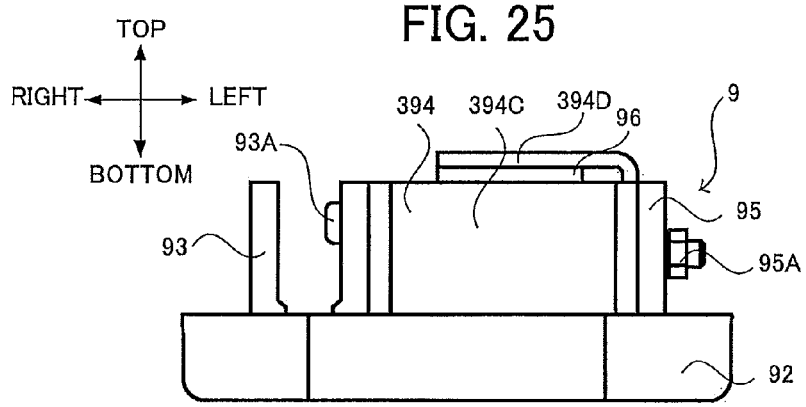
FIG. 25 is a front view showing the circuit board unit in the shear wrench according to the third embodiment.
Figure 26:
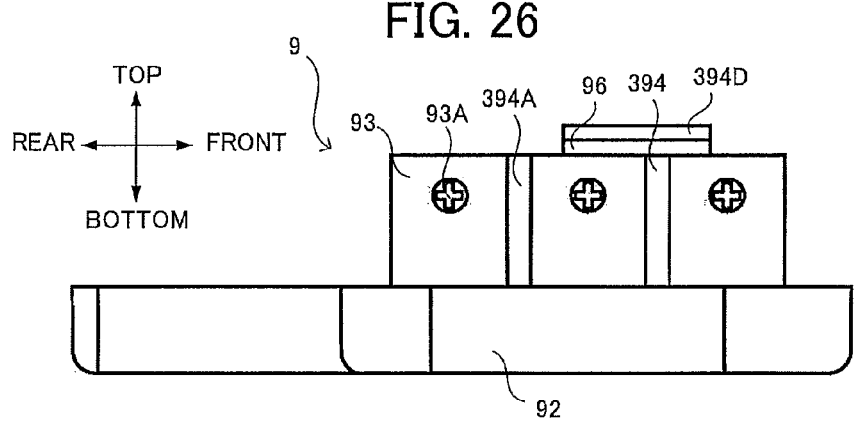
FIG. 26 is a right side view showing the circuit board unit in the shear wrench according to the third embodiment.
Figure 27:
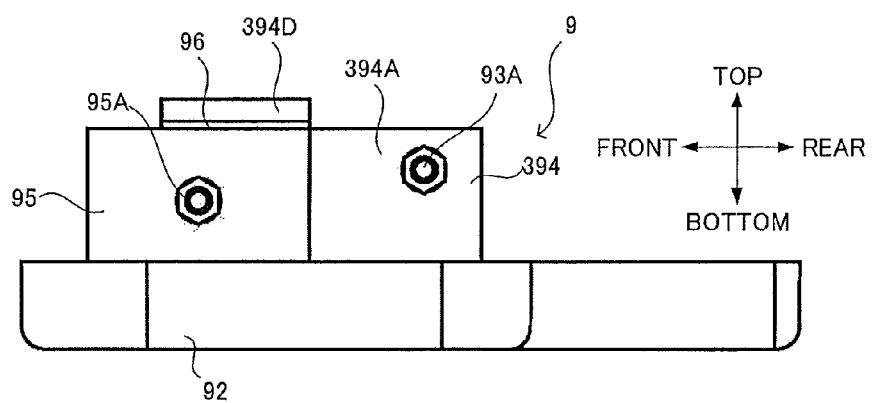
FIG. 27 is a left side view showing the circuit board unit in the shear wrench according to the third embodiment.

As shown in FIGS. 21 to 27, a heat releasing member 394 includes a switching element connecting part 394A connecting to the switching element 93, a diode bridge connecting part 394B connecting to the diode bridge 95, a connecting part 394C connecting the switching element connecting part 394A to the diode bridge connecting part 394B, and a capacitor connecting part 394D connecting to the capacitor 96. As shown in FIG. 23, the switching element connecting part 394A is fixedly connected to the left side of the switching elements 93A4-93A6 on the array B by the bolt 93A and the diode bridge connecting part 394B is fixedly connected to the right side of the diode bridge 95 by the bolt 95A.

As shown in FIGS. 21 and 22, the diode bridge connecting part 394B has a top edge portion from which the capacitor connecting part 394D extends and bends so as to be in contact with an upper surface of the capacitor 96. With this configuration, since the capacitor connecting part 394D connects to the capacitor 96, a heat generated in the capacitor 96 can be efficiently released, thereby preventing the capacitor 96 from being broken by heat. Further, the capacitor connecting part 394D covers the upper surface of the capacitor 96, thereby avoiding a contact between the capacitor 96 and a part of the housing 2 from above when the housing 2 is deformed.

Next, a shear wrench 401 according to a fourth embodiment will be described with reference to FIGS. 28 to 34 wherein like parts and components are designated by the same reference numerals as those shown in the first embodiment to avoid duplicating description.

Figure 28:
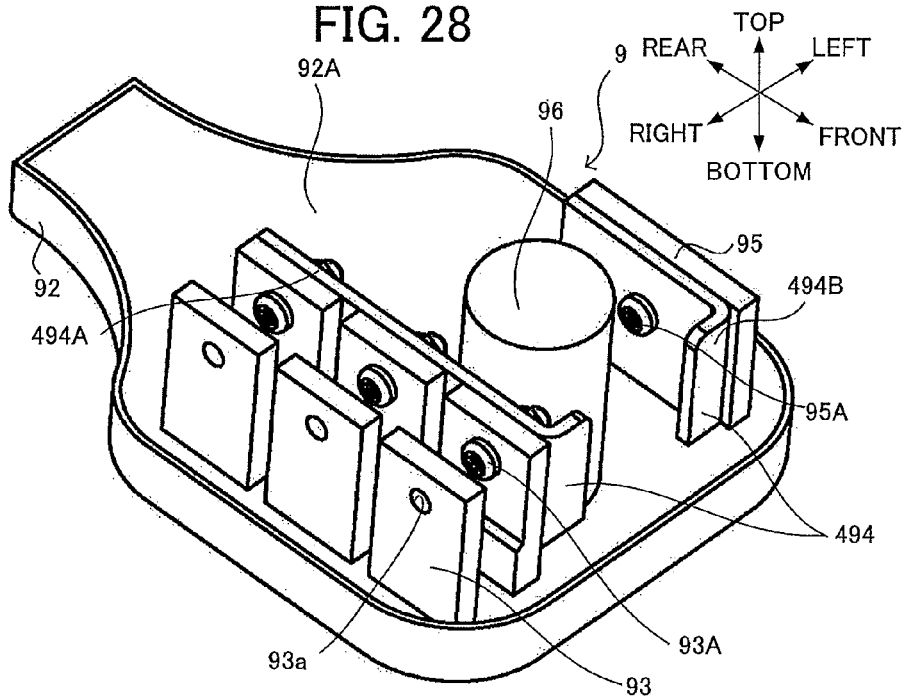
FIG. 28 is a front perspective view showing a circuit board unit in a shear wrench according to a fourth embodiment of the present invention.
Figure 29:
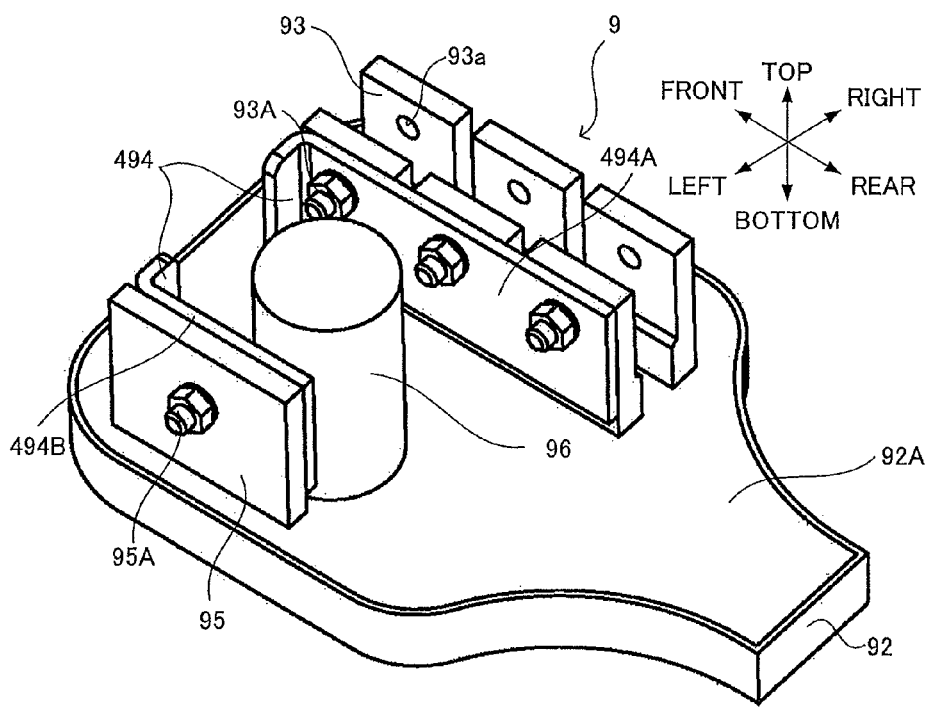
FIG. 29 is a rear perspective view showing the circuit board unit in the shear wrench according to the fourth embodiment.
Figure 32:
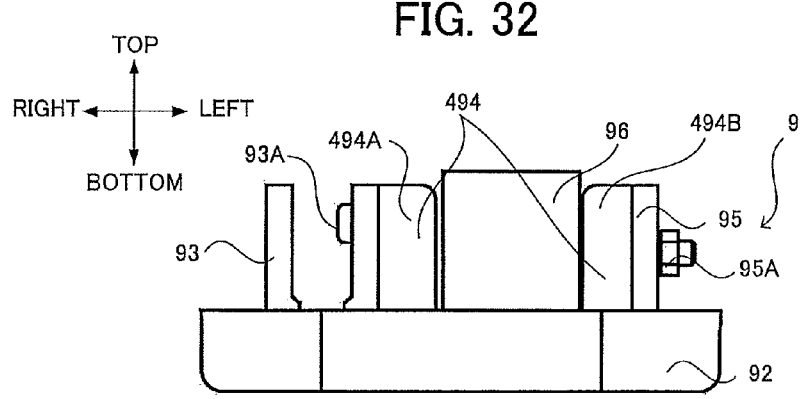
FIG. 32 is a front view showing the circuit board unit in the shear wrench according to the fourth embodiment.
Figure 33:
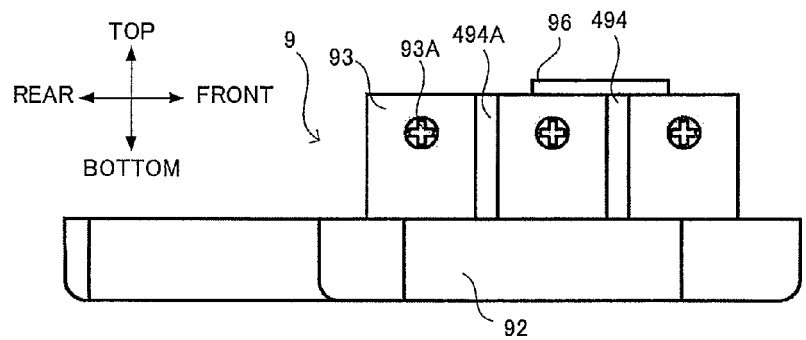
FIG. 33 is a right side view showing the circuit board unit in the shear wrench according to the fourth embodiment.
Figure 34:
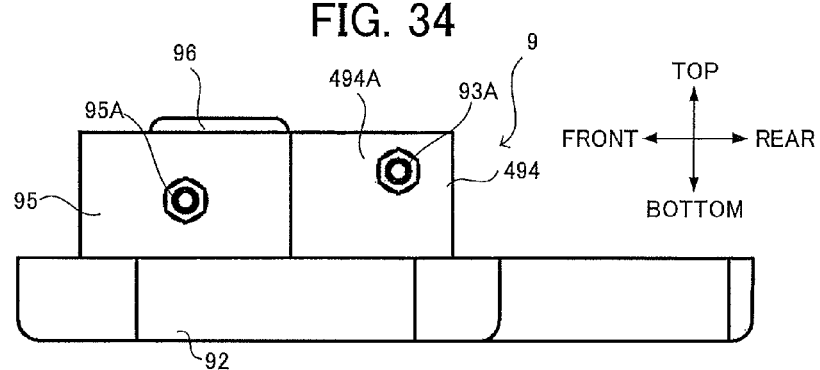
FIG. 34 is a left side view showing the circuit board unit in the shear wrench according to the fourth embodiment.
Figure 35:
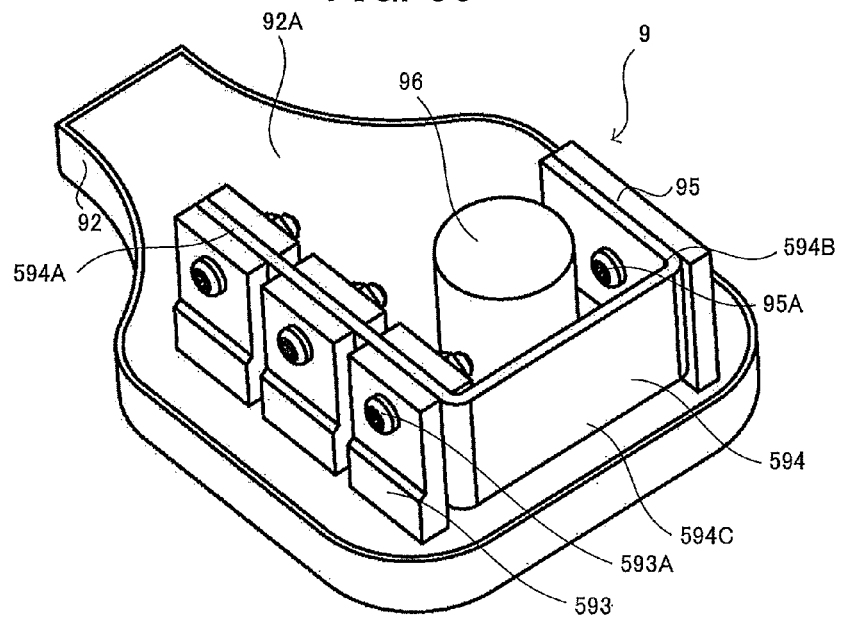
FIG. 35 is a front perspective view showing a circuit board unit in a shear wrench according to a fifth embodiment of the present invention.
Figure 36:
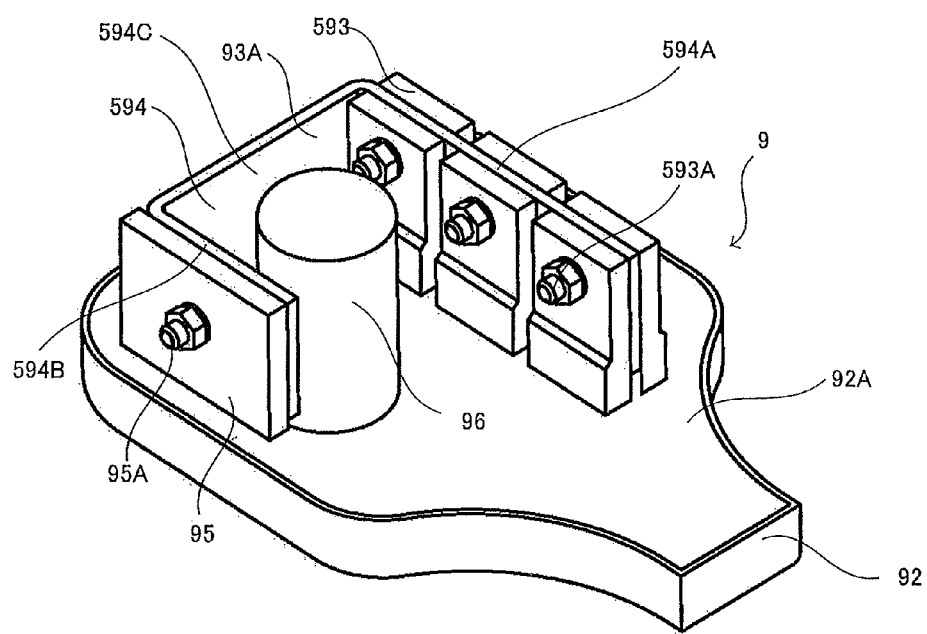
FIG. 36 is a rear perspective view showing the circuit board unit in the shear wrench according to the fifth embodiment.

As shown in FIGS. 28 to 34, a heat releasing member 494 is configured of a switching element connecting part 494A connecting to the switching element 93 and a diode bridge connecting part 494B connecting to the diode bridge 95. As shown in FIG. 28, the heat releasing member 494 is divided into the switching element connecting part 494A and the diode bridge connecting part 494B. As shown in FIG. 30, the switching element connecting part 494A is fixedly connected to the left side of the switching elements 93A4-93A6 on the array B by the bolt 93A and the diode bridge connecting part 494B is fixedly connected to the right side of the diode bridge 95 by the bolt 95A. By the division of the heat releasing member 494, a large working space on the circuit board 91 can be obtained and workability for disposing elements on the circuit board 91 can be enhanced.

Next, a shear wrench 501 according to a fifth embodiment will be described with reference to FIGS. 35 to 41 wherein like parts and components are designated by the same reference numerals as those shown in the first embodiment to avoid duplicating description.

Figure 37:
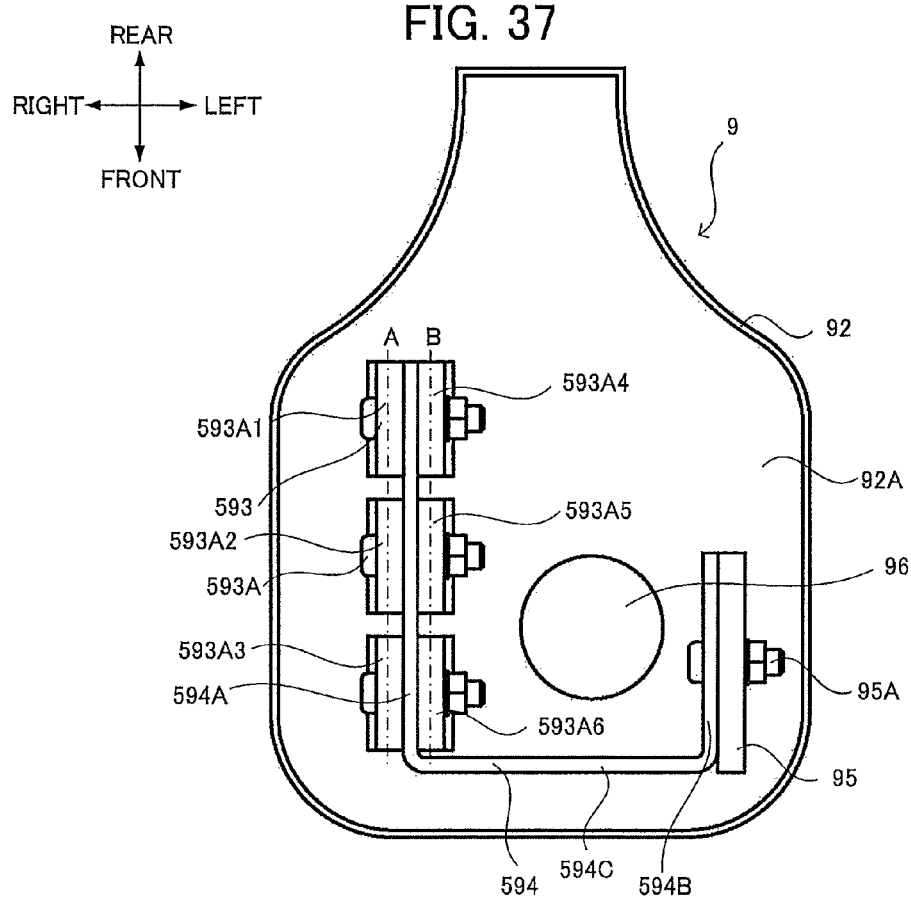
FIG. 37 is a plane view showing the circuit board unit in the shear wrench according to the fifth embodiment.
Figure 38:
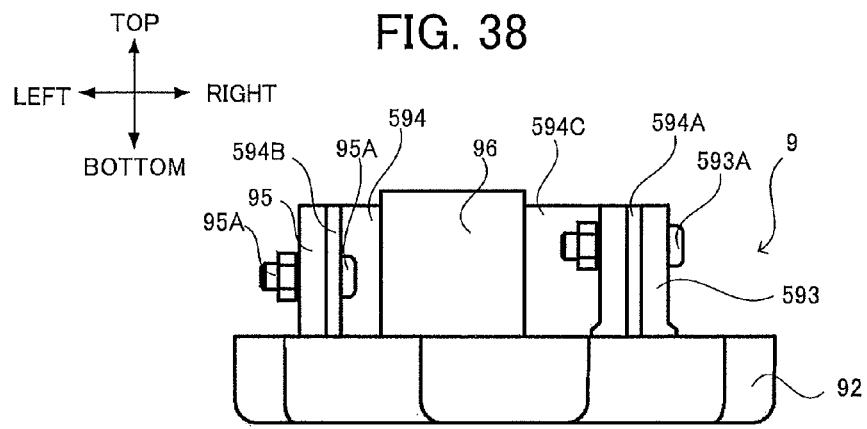
FIG. 38 is a rear view showing the circuit board unit in the shear wrench according to the fifth embodiment.
Figure 39:
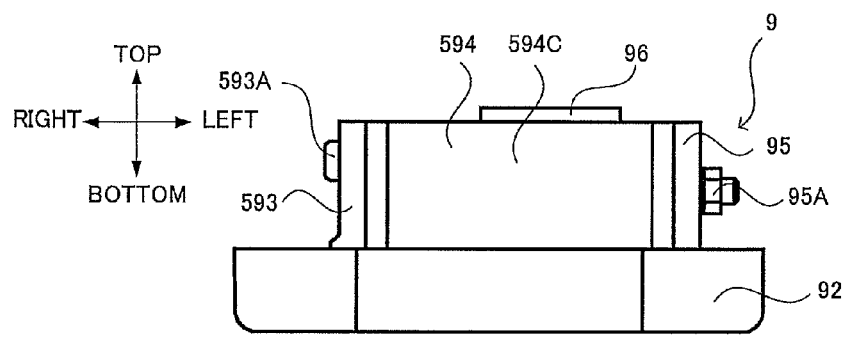
FIG. 39 is a front view showing the circuit board unit in the shear wrench according to the fifth embodiment.
Figure 40:
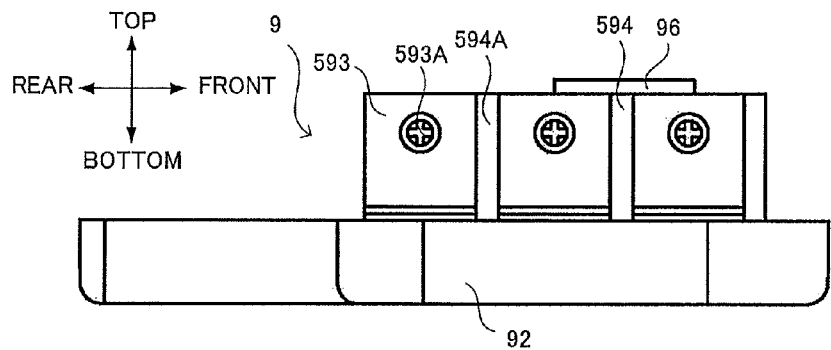
FIG. 40 is a right side view showing the circuit board unit in the shear wrench according to the fifth embodiment.
Figure 41:
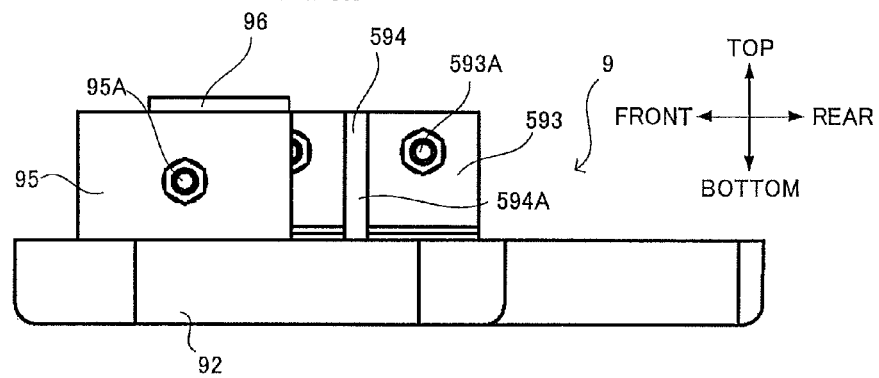
FIG. 41 is a left side view showing the circuit board unit in the shear wrench according to the fifth embodiment.

As shown in FIG. 37, the circuit board 91 is provided with six switching element 593 and a heat releasing member 594. The switching elements 593A1-593A3 are juxtaposed in front-to-rear direction (array A) and the switching elements 593A4-593A6 are juxtaposed in front-to-rear direction (array B) apart from the array A at a prescribed distance. A distance between the array A and the array B of the fifth embodiment is shorter than that of the first-fourth embodiments. Specifically, the distance is substantially equivalent to a thickness of the heat releasing member 594.

The heat releasing member 594 is made of aluminum and has a cross-section substantially like a letter L as viewed from top. As shown in FIGS. 35 to 41, the heat releasing member 594 includes a switching element connecting part 594A connecting to the switching element 593, a diode bridge connecting part 594B connecting to the diode bridge 95, and a connecting part 594C connecting the switching element connecting part 594A to the diode bridge connecting part 594B. As shown in FIG. 37, the switching element connecting part 594A has a left side surface fixedly connected to the right side of the switching elements 593A4-593A6 on the array B, and a right side surface fixedly connected to the left side of the switching elements 593A1-593A3 on the array A by a bolt 593A. To enhance adhesiveness and insulation between the switching elements 593 and the switching element connecting part 594A, an insulation rubber is provided therebetween.

The diode bridge connecting part 594B is fixedly connected to the right side of the diode bridge 95 by the bolt 95A. With this configuration, the heat releasing member 594 is connected not only to the switching elements 593A4-593A6 on the array B but also to the switching elements 593A1-593A3 on the array A, thereby efficiently releasing heat in the switching elements 593A1-593A3. Thus, thermal breakdown of the switching elements 593 and the diode bridge 95 can be avoided.

While the invention has been described in detail with reference to the embodiments thereof, it would be apparent to those skilled in the art that various changes and modifications may be made therein without departing from the spirit of the invention.

In the above-mentioned embodiments, the heat releasing member is made of aluminum. However, other metal material such as copper or stainless steel may be available.

In the above-mentioned embodiments, the heat releasing grease is applied between the heat releasing member and the switching elements. However, the heat releasing member and the switching element may be directly contacted to each other without the heat releasing grease.

In the above-mentioned embodiments, the heat releasing member has a flat outer surface. However, the heat releasing member may have a patterned indented outer surface. With this configuration, the heat releasing member can possess large surface area, thereby enhancing cooling efficiency.

In the first, third, and fourth embodiments, the heat releasing member is connected to the right side of the diode bridge. However, the heat releasing member may be connected to the left side of the diode bridge. With this configuration, the heat releasing member is positioned adjacent to the intake ports, thereby enhancing cooling efficiency.

In the above-mentioned embodiments, the six switching elements as an FET are provided on the circuit board. However, two switching elements may be provided. Further, four or eight switching elements may be provided.

In the above-mentioned embodiments, the diode bridge is configured of four conventional diodes. However, a rectifying device other than the diode bridge may be employed, for example, only one diode may be employed.

In the above-mentioned embodiments, the heat releasing member is fixed to the switching elements. However, the heat releasing member may be fixed to the circuit board.

In the above-mentioned embodiments, the shear wrench as a power tool is employed. However, the above-mentioned embodiment can be available for a hammer tool or a hammer drill.

In the above-mentioned embodiments, the external electric power is supplied by the power cable. However, a rechargeable battery can be used instead of the external power source.

What is claimed is:

1. A power tool comprising:
    a brushless motor having a rotational shaft extending in a top-to-bottom direction;
    a cooling fan fixed to the rotational shaft;
    an output unit extending in a front-to-rear direction and disposed above the brushless motor;
    a circuit board unit including a switching element for driving the brushless motor and a heat releasing member connected to the switching element, the circuit board unit extending in the front-to-rear direction and being disposed below the brushless motor, wherein the circuit board unit is separated from the brushless motor; and
    a housing including a motor housing accommodating the brushless motor, a cooling fan accommodating portion accommodating the cooling fan, and a circuit board accommodating portion accommodating the circuit board unit, wherein the motor housing and the circuit board accommodating portion are separated by a partition, wherein the partition extends from the housing,
    wherein the rotational shaft defines an axis line extending an axial direction thereof,
    wherein the cooling fan, the brushless motor, and the circuit board unit are located on the axis line in this order from top to bottom,
    wherein the cooling fan accommodating portion is formed with an outlet port and the circuit board accommodating portion is formed with an intake port, the housing defining an air flow path from the intake port to the outlet port,
    wherein the motor housing is in communication with the circuit board accommodating portion through a ventilation port, the ventilation port being located on the air flow path.

2. The power tool as claimed in claim 1, wherein the intake port is formed at a position between the brushless motor and the circuit board unit.

3. The power tool as claimed in claim 1, wherein the motor housing is provided with the cooling fan accommodating portion positioned above the brushless motor wherein the cooling fan introduces a cooling air into the housing through the intake port, the cooling air passes the circuit board accommodating portion, the ventilation port, and the motor housing and is discharged through the outlet port.

4. The power tool as claimed in claim 3, wherein the cooling air introduced into the housing through the intake port with the cooling fan passes an inside of the brushless motor through the ventilation port.

5. The power tool as claimed in claim 3, wherein the rotational shaft is accommodated in the motor housing and extends in a top-to-bottom direction,
wherein the circuit board accommodating portion is disposed below the motor housing.

6. The power tool as claimed in claim 5, wherein the circuit board unit includes:
a circuit board for mounting thereon the controller; and a circuit board support member accommodating the circuit board and filled with an insulation material, the circuit board support member being accommodated in the circuit board accommodating portion.

7. The power tool as claimed in claim 6, wherein the heat releasing member is located on the air flow path.

8. The power tool as claimed in claim 6,
wherein the rotational shaft defines an axis line extending an axial direction thereof, wherein the output unit intersects with the axis line and extends substantially parallel to the circuit board.

9. The power tool as claimed in claim 1, wherein the brushless motor includes a rotor coaxially fixed to the rotational shaft and a stator having a coil,
wherein the circuit board unit includes a circuit board for mounting thereon the controller,
wherein the coil is connected to the circuit board via a power cable passing through the ventilation port.

10. A power tool comprising:
a brushless motor;
a switching element for driving the brushless motor; and
a housing including a motor housing accommodating the brushless motor, a handle housing connected to the motor housing, and a circuit board accommodating portion disposed below the brushless motor, the circuit board accommodating portion being formed with an intake port,
wherein the circuit board accommodating portion accommodates a circuit board unit for mounting thereon the switching element, wherein the circuit board unit is separated from the brushless motor and includes a circuit board,
wherein the housing is divided by a partition into the circuit board accommodating portion and the motor housing, the partition being formed with a ventilation port for providing a communication between the circuit board accommodating portion and the motor housing, wherein the partition extends from the housing,
wherein a cooling air is suctioned from the intake port and led to the motor housing through the ventilation port,
wherein the intake port is formed only in the circuit board accommodating portion and positioned below the partition and above the circuit board.

11. The power tool as claimed in claim 10, wherein the brushless motor includes a rotational shaft and a cooling fan coaxially fixed to the rotational shaft,
wherein the motor housing includes a cooling fan accommodating portion formed with an outlet port for accommodating the cooling fan, the cooling fan accommodating portion being positioned above the brushless motor,
wherein the housing defines an air flow path through which the cooling air passes upon the rotation of the cooling fan,
wherein the air flow path is formed of the intake port, the circuit board accommodating portion, the ventilation port, the motor housing, the cooling fan accommodating portion, and the outlet port.

12. The power tool as claimed in claim 10, wherein the switching element is located adjacent to the intake port.

13. The power tool as claimed in claim 12, further comprising a heat releasing member connected to the switching element.

14. The power tool as claimed in claim 13, wherein the intake port is located nearer to the heat releasing member than the switching element.

15. The power tool as claimed in claim 10, wherein the handle housing is of a D shape.

* * * * *